(12) United States Patent
Khoukhi et al.

(10) Patent No.: US 8,977,394 B2
(45) Date of Patent: Mar. 10, 2015

(54) CONTROL METHOD FOR MOBILE PARALLEL MANIPULATORS

(71) Applicant: King Fahd University of Petroleum and Minerals, Dhahran (SA)

(72) Inventors: Amar Khoukhi, Dhahran (SA); Mutaz M. Hamdan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 219 days.

(21) Appl. No.: 13/732,217

(22) Filed: Dec. 31, 2012

(65) Prior Publication Data

US 2014/0188273 A1    Jul. 3, 2014

(51) Int. Cl.
| | |
|---|---|
| *G05B 19/18* | (2006.01) |
| *G06F 19/00* | (2011.01) |
| *G05B 19/04* | (2006.01) |
| *G05B 19/418* | (2006.01) |
| *B25J 9/16* | (2006.01) |

(52) U.S. Cl.
CPC ............... *B25J 9/162* (2013.01); *B25J 9/1623* (2013.01)
USPC .......... 700/250; 700/245; 700/247; 700/248; 700/251

(58) Field of Classification Search
USPC .......................... 700/250, 245, 247, 248, 251
See application file for complete search history.

(56) References Cited

U.S. PATENT DOCUMENTS

| | | | |
|---|---|---|---|
| 5,294,873 A | * | 3/1994 | Seraji .......................... 318/568.1 |
| 7,184,992 B1 | | 2/2007 | Polyak et al. |
| 7,400,108 B2 | * | 7/2008 | Minor et al. ............. 318/568.12 |
| 2012/0290131 A1 | | 11/2012 | Khoukhi |

OTHER PUBLICATIONS

"Multi-Objective Off-Line Programming of Parallel Kinematic Machines"; Khoukhi, Amar; Baron, Luc; and Balazinski, Marek; Technical Report CDT-P2877-05.*
"Constrained multi-objective trajectory planning of parallel kinematic machines"; Khoukhi, Amar; Baron, Luc; and Balazinski, Marek; Robotics and Computer-Integrated Manufacturing 25 (2009) 756-769.*
"Inverse Kinematics and Geometric Constraints for Articulated Figure Manipulation"; Welman, Chris; Simon Fraser University; Sep. 1993.*
"Recursive Kinematics and Inverse Dynamics for Parallel Manipulators"; Khan, Waseem A.; Krovi, Venkat N.; Saha, Subir K.; Angeles, Jorge.*
Amar Khoukhi, Luc Barona, Marek Balazinskia, Kudret Demirli., "A hierarchical neuro-fuzzy system to near optimal-time trajectory planning of redundant manipulators." Engineering Applications of Artificial Intelligence, 2008, vol. 21, pp. 974-984 (abstract only).

* cited by examiner

*Primary Examiner* — Nicholas Kiswanto
(74) *Attorney, Agent, or Firm* — Richard C. Litman

(57) ABSTRACT

In the control method for mobile parallel manipulators, kinematic singularity and redundancy are solved through joint limits avoidance and manipulability criteria. By taking the MPM self-motion into consideration due to its redundancy, the inverse kinematic is derived using a hybrid neuro-fuzzy system, such as NeFIK. The discrete augmented Lagrangian (AL) technique is used to solve the highly nonlinear constrained multi-objective optimal control problem. An adaptive neuro-fuzzy inference system (ANFIS)-based structure (based on the result of the AL solution) is used to solve the online trajectory planning of the MPM.

20 Claims, 6 Drawing Sheets

CONTROL METHOD FOR MOBILE PARALLEL MANIPULATORS

BACKGROUND OF THE INVENTION

1. Field of the Invention

The present invention relates to control mechanisms for robotic devices, and more particularly to a time- and energy-optimized control method for mobile parallel manipulators.

2. Description of the Related Art

U.S. Patent Application Publication Number 2012/0290131, titled "PARALLEL KINEMATIC MACHINE TRAJECTORY PLANNING METHOD" and published Nov. 15, 2012, which is hereby incorporated by reference in its entirety, discloses a parallel kinematic machine (PKM) trajectory planning method operable via a data-driven neuro-fuzzy multistage-based system. Offline planning based on robot kinematic and dynamic models, including actuators, was performed to generate a large dataset of trajectories covering most of the robot workspace and minimizing time and energy, while avoiding singularities and limits on joint angles, rates, accelerations and torques. The method implements an augmented Lagrangian solver on a decoupled form of the PKM dynamics in order to solve the resulting nonlinear constrained optimal control problem. Using outcomes of the offline-planning, the data-driven neuro-fuzzy inference system was built to learn, to capture, and to optimize the desired dynamic behavior of the PKM. While the above method works for stationary machines, there remains the problem of planning a trajectory for a mobile parallel kinematic machine (MPM).

Thus, a control method for mobile parallel manipulators solving the aforementioned problems is desired.

SUMMARY OF THE INVENTION

In the present control method for mobile parallel manipulators, kinematic singularity and redundancy are solved through joint limits avoidance and manipulability criteria. By taking the MPM self-motion into consideration due to its redundancy, the inverse kinematic is derived using a hybrid neuro-fuzzy system, such as NeFIK. The discrete augmented Lagrangian (AL) technique is used to solve the highly nonlinear constrained multi-objective optimal control problem. An adaptive-neural fuzzy inference system (ANFIS)-based structure (based on the result of the AL solution) is used to solve the online trajectory planning of the MPM.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

At the outset, it will be understood that the diagrams in the Figures depicting the present control method for mobile parallel manipulators are exemplary only, and may be embodied in a dedicated electronic device having a microprocessor, microcontroller, digital signal processor, application specific integrated circuit, field programmable gate array, any combination of the aforementioned devices, or other device that combines the functionality of the control method for mobile parallel manipulators onto a single chip or multiple chips programmed to carry out the method steps described herein, or may be embodied in a general purpose computer having the appropriate peripherals attached thereto and software stored on non-transitory computer readable media, such as hard drives, programmable memory chips, floppy disks, USB drives, and the like, that can be loaded into main memory and executed by a processing unit to carry out the functionality and steps of the method described herein.

Figure 1:
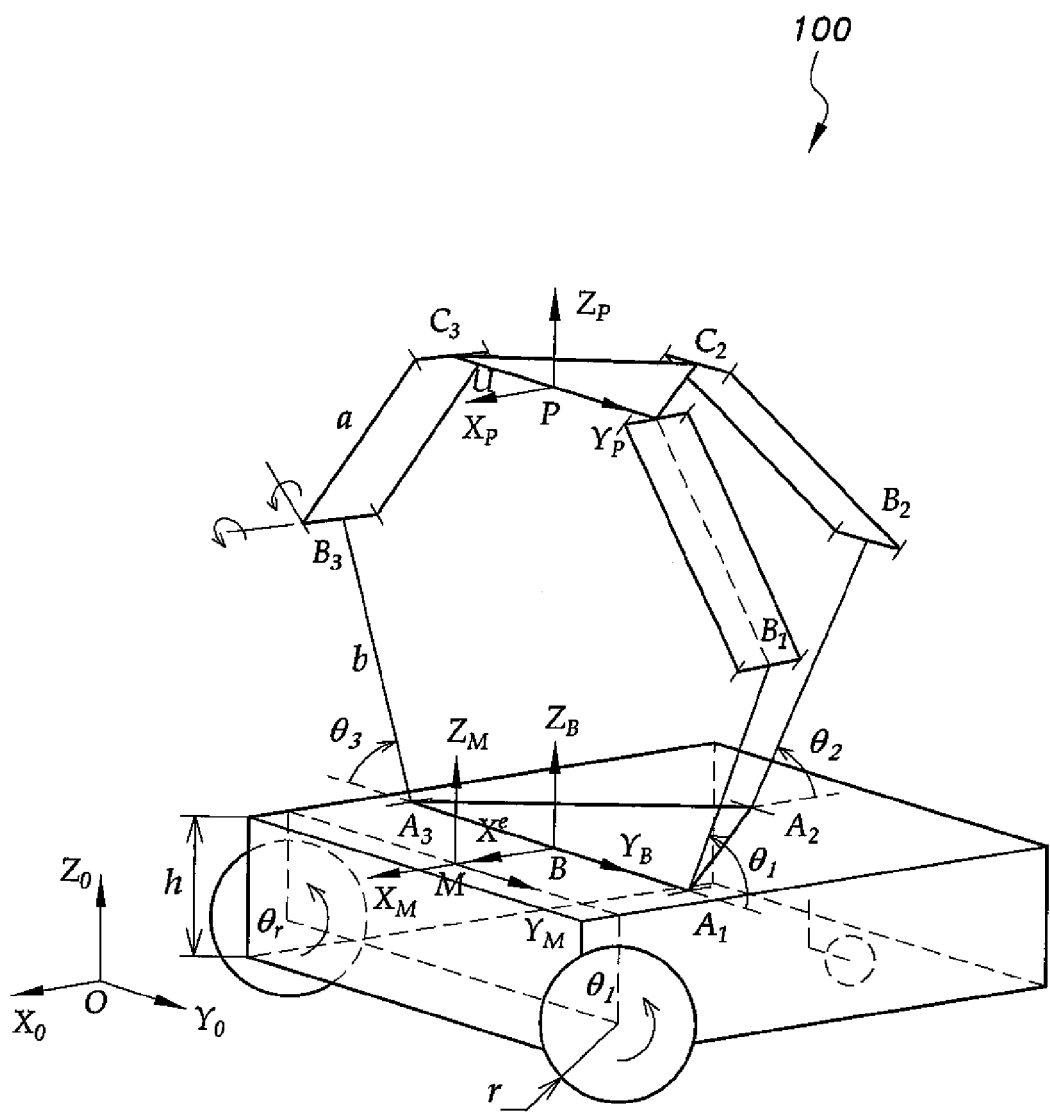
FIG. 1 is a schematic diagram illustrating a mobile parallel manipulator.

In the control method for mobile parallel manipulators, kinematic singularity and redundancy are solved through joint limits avoidance and manipulability criteria. As shown in FIG. 1, the mobile parallel manipulator (MPM) 100 is composed of a multiple degree of freedom parallel platform carried by an autonomous wheeled mobile robot. In the example shown, the manipulator is a 3-RRPaR parallel robot. A 3-RRPaR parallel manipulator has a moving platform disposed over a base, the moving platform being supported by three limbs of identical RRPaR kinematic structure in which the first R joint is actuated by a rotary actuator, where the notation of R and Pa stands for the revolute joint and parallelogram, respectively. By taking the MPM self-motion into consideration due to its redundancy, the inverse kinematic is derived using a hybrid neuro-fuzzy system, such as NeFIK. The discrete augmented Lagrangian (AL) technique is used to solve the highly nonlinear constrained multi-objective optimal control problem. An adaptive neuro-fuzzy inference system (ANFIS)-based structure (based on the result of the AL solution) is used to solve the online trajectory planning of the MPM.

Figure 2:
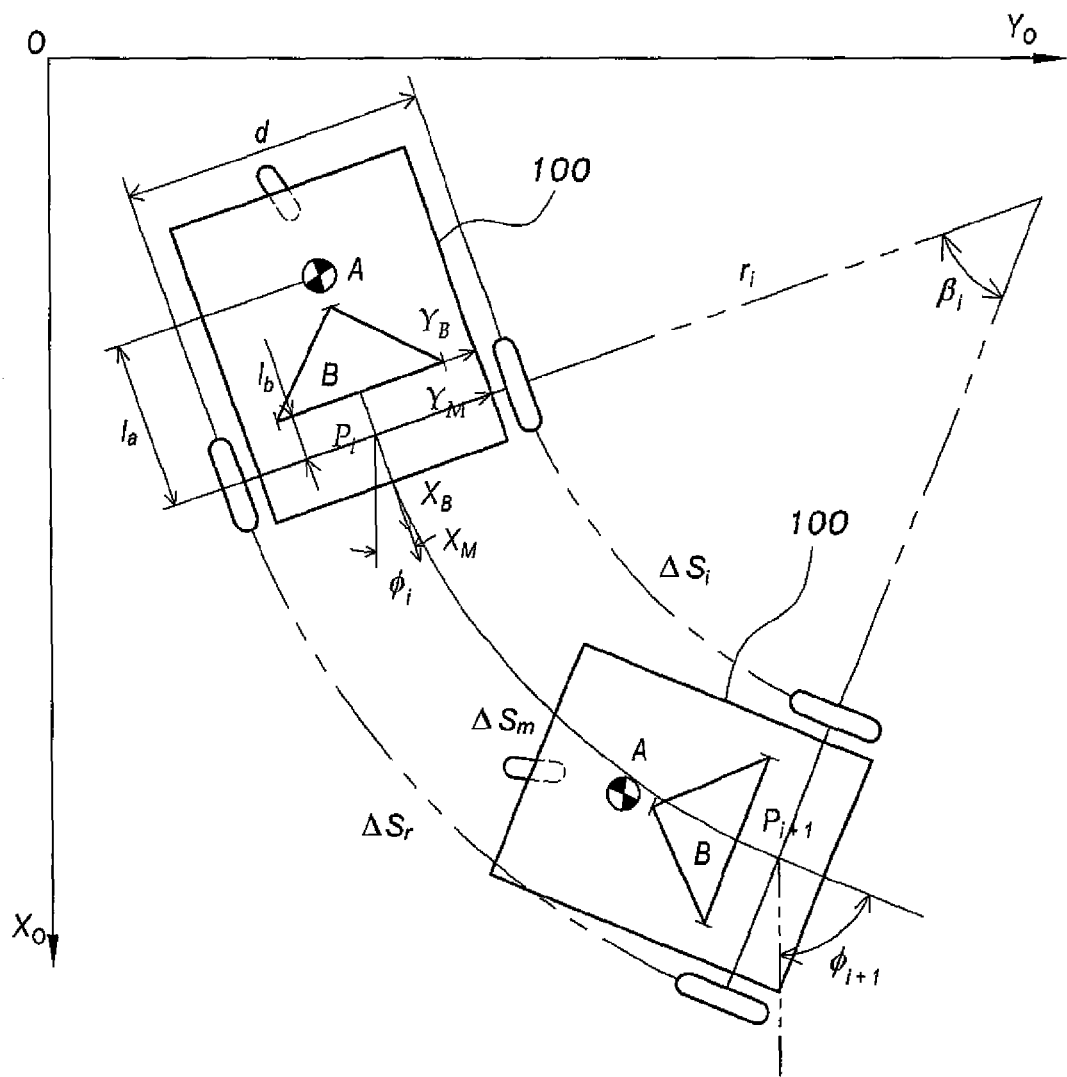
FIG. 2 is a schematic representation of locomotion capability of the MPM within designated frames of reference.

The present method generates full set of torques that derive motion of the MPM 100 from start point to end point while achieving optimal time, energy, or both as required. The present control method for mobile parallel manipulators uses neuro-fuzzy structure to solve the inverse kinematic problem. The MPM 100 is composed of a multiple degree of freedom parallel platform carried by an autonomous wheeled mobile robot. The multiple degree of freedom parallel platform is a modified version of a DELTA parallel robot. The autonomous wheeled platform is a three-wheeled nonholonomic species. As shown in FIG. 2, the MPM 100 is assumed to just move on a plane. A fixed Cartesian frame (global frame) $O\{X_O, Y_O, Z_O\}$ is assigned on the plane of motion, a moving frame $M\{X_M, Y_M, Z_M\}$ on the mobile platform, a moving frame $B\{X_B, Y_B, Z_B\}$ at the centered point B of the base platform $\Delta A_1 A_2 A_3$, and another moving Cartesian frame $P\{X_P, Y_P, Z_P\}$ on the triangular moving platform $\Delta C_1 C_2 C_3$ at the centered point P.

For frame M, the $Y_M$ axis is along the coaxial line of the two fixed wheels, $X_M$ is perpendicular to $Y_M$ and passes through the midpoint of the line segment connecting the two fixed wheel centers, and the $Z_M$ axis is vertical to the mobile platform. In addition, the $X_B$ and $X_P$ axes are parallel to the $X_M$ axis, and the $Y_B$ and $Y_P$ axes are parallel to the $Y_M$ axis, respectively.

In order to get a compact structure, such as in a parallel manipulator, both the base and moving platforms are designed to be isosceles right triangles described by parameters of e and u, respectively, i.e., $BA_i=e$ and $PC_i=u$, for i=1, 2, and 3. Also, the actuated variable of the $i^{th}$ limb is denoted by angle $\theta_i$. The connecting joints between the upper and lower links are denoted as $B_i$, and the lengths of upper and lower links for each limb are a and b respectively. The plane of motion can be described as follows. The kinematics of the mobile platform consists of three parameters of coordinates of point M ($x_m$, $y_m$) and the heading angle ($\phi_m$). Referring to FIG. 1, let d be the distance between the two fixed wheels, let $l_b$ be the offset of the base platform of the parallel robot with respect to the origin of frame M, and let $l_a$ denote the offset of the mass center A of the mobile platform with respect to frame M. Additionally, $P^i(x_m^i, y_m^i, \phi_m^i)$ and $P^{i+1}(x_m^{i+1}, y_m^{i+1}, \phi_m^{i+1})$ represent coordinates of the mobile platform at time t and $t^{i+1}$ respectively. $\beta_i$ and $r_i$ are the corresponding yaw angle and steering radius at time $t_i$. $\Delta S_l$, $\Delta S_r$, and $\Delta S_m$ denote the advance of the left wheel, the right wheel, and the origin of the frame M in the time interval ($\Delta t = t^{i+1} - t^i$), respectively.

Utilizing the plane of motion description illustrated in FIG. 2, it can be shown that $$\begin{cases} \dot{x}_m = \frac{rc\phi_m}{2}(\theta_L + \theta_r) \\ \dot{y}_m = \frac{rs\phi_m}{2}(\theta_L + \theta_r) \\ \dot{\phi}_m = \frac{r}{d}(\theta_r - \theta_L) \end{cases} \quad (1)$$

Using abbreviated notation, c stands for cosine, s stands for sine, and r is the radius of each driving wheel. Also, $\theta_L$ and $\theta_r$ denote the rotating angles of the left and right driving wheels, respectively.

Let the general coordinates of the mobile platform be designated by $\xi = [x_m \ y_m \ \phi_m \theta_L \ \theta_r]^T$. Solve equation (1) for the nonholonomic constraints of the MPR, which can be written as:

$$D(\xi) \cdot \dot{\xi} = 0, \text{ where} \quad (2)$$

$$D(\xi) = \begin{bmatrix} c\phi_m & s\phi_m & -d/2 & -r & 0 \\ c\phi_m & s\phi_m & d/2 & 0 & -r \\ s\phi_m & -c\phi_m & 0 & 0 & 0 \end{bmatrix} \quad (3)$$

The forward kinematics problem is very complex for a parallel robot, while the inverse kinematics problem is extremely straightforward, in general. The forward kinematics solution is generated for the designed MPM.

Assuming that linear ($v_m$) and angular ($\omega_m$) velocities of the mobile platform and assuming the actuated inputs of the actuators ($\theta_i$, i=1, 2, 3), the position (x, y, z) and orientation ($\phi$) of the mobile platform are solved using the forward kinematics.

In this research we assume that there is no slip in the wheels of mobile platform on all directions. As $\Delta t \to 0$, the velocities during this time interval can be considered as a constant:

$$|P^i P^{i+1}| \approx \Delta S_m = v_m \cdot \Delta t,$$

$$\Delta x_m^i = x_m^{i+1} - x_m^i \approx |P^i P^{i+1}| \cdot c\phi_m^i = v_m \cdot \Delta t \cdot c\phi_m^i,$$

$$\Delta y_m^i = y_m^{i+1} - y_m^i \approx |P^i P^{i+1}| \cdot s\phi_m^i = v_m \cdot \Delta t \cdot s\phi_m^i,$$

and $$\beta \approx \Delta \phi_m^i = \phi^{i+1} - \phi^i = \omega_m \cdot \Delta t. \quad (4)$$

Since eq. (4) is applied in all the motions of the mobile platform, we can delete the superscript i. Thus:

$$\begin{aligned} \dot{x}_m &= \lim_{\Delta t \to 0} \left(\frac{\Delta x_m}{\Delta t}\right) = v_m \cdot c\phi_m, \\ \dot{y}_m &= \lim_{\Delta t \to 0} \left(\frac{\Delta y_m}{\Delta t}\right) = v_m \cdot s\phi_m, \\ \dot{\phi}_m &= \lim_{\Delta t \to 0} \left(\frac{\Delta \phi_m}{\Delta t}\right) = \omega_m. \end{aligned} \quad (5)$$

Integration of eq. (5), gives the posture of the mobile platform:

$$\begin{aligned} x_m(t) &= \int_0^t \dot{x}_m \cdot dt = \int_0^t v_m(t) \cdot c(\phi_m(t)) \cdot dt, \\ y_m(t) &= \int_0^t \dot{y}_m \cdot dt = \int_0^t v_m(t) \cdot s(\phi_m(t)) \cdot dt, \\ \phi_m(t) &= \int_0^t \dot{\phi}_m \cdot dt = \int_0^t \omega_m(t) \cdot dt. \end{aligned} \quad (6)$$

Let us assume that the wheels of mobile platform have no slip in any direction. Let $P = [x \ y \ z]^T$ and $^B P = [x_p \ y_p \ z_p]^T$ be the vectors of point P in the fixed frame O and the moving frame B, respectively. Also, in frame B, let $^B \vec{e}_i = \overrightarrow{BA_i}$, $^B \vec{b}_i = \overrightarrow{A_i B_i}$ and $^B \vec{c}_i = \overrightarrow{PC_i}$. Referring to FIG. 2, we obtain:

$$^B e_i = [ec\phi_i es\phi_i 0]^T, {}^B c_i = [uc\phi_i us\phi_i 0]^T,$$

$$^B b_i = [bc\theta_i c\phi_i bc\theta_i s\phi_i bs\theta_i]^T \quad (7)$$

where $\phi_i = (i\pi)/2$, for i=1, 2, and 3. Since the distance between $B_i$ and $C_i$ is a constant a, we have:

$$\|^B P + {}^B c_i - {}^B e_i - {}^B b_i\| = a \quad (8)$$

By substituting eq. (7) in eq. (8), we get, $$x_p^2 + (y_p + u - e - bc\theta_1)^2 + (z_p - bs\theta_1)^2 = a^2, \quad (9)$$

$$(x_p - u + e + bc\theta_2)^2 + y_p^2 + (z_p - bs\theta_2)^2 = a^2, \quad (10)$$

$$x_p^2 + (y_p + u - e - bc\theta_3)^2 + (z_p - bs\theta_3)^2 = a^2, \quad (11)$$

and solving equations (9) and (10) to get $x_p$ and $y_p$ as a function of $z_p$, we get the following result:

$$\begin{aligned} x_p = -(&b(2bc\theta_1 c\theta_3 w - bc\theta_2 wc\theta_1 - bc\theta_2 wc\theta_3 - w^2 c\theta_1 - \\ &w^2 c\theta_3 + 2w^2 c\theta_2 + 2z_p s\theta_2 w + z_p bs\theta_1 c\theta_3 - wz_p s\theta_1 - \\ &wz_p s\theta_3 + bz_p c\theta_1 s\theta_3 - bz_p c\theta_1 s\theta_2 - bz_p c\theta_3 s\theta_2))/ \end{aligned}$$

-continued $$y_p = -\frac{b(wc\theta_1 - wc\theta_3 + z_p s\theta_1 - z_p s\theta_3)}{-2w + bc\theta_1 + bc\theta_3} \frac{(-bwc\theta_1 - bwc\theta_3 - 2bwc\theta_2 + b^2 c\theta_1 c\theta_2 + b^2 c\theta_3 c\theta_2 + 2w^2)}{},$$

where $w = u - e$.

Substituting $x_p$ and $y_p$ in (11) and solving for $z_p$, and then solving eq. (10) and eq. (11), leads to solutions for the forward kinematics of the parallel robot, i.e., $$x_p = f_1 z_p + f_0, \, y_p = e_1 z_p + e_0, \, z_p = \frac{-h_1 + \sqrt{h_1^2 - 4h_2 h_0}}{2h_2} \quad (12)$$

where $e_1 = -\frac{n_1}{n_2}, \, e_0 = -\frac{n_0}{n_2},$ $f_1 = \frac{m_2 n_1}{m_3 n_2} - \frac{m_1}{m_3}, \, f_0 = \frac{m_2 n_0}{m_3 n_2} - \frac{m_0}{m_3},$ $h_2 = 1 + e_1^2 + f_1^2,$ $h_1 = 2[e_1(e_0 + u - e - bc\theta_1) + f_1 f_0 - bs\theta_1],$ $h_0 = (e_0 + u - e - bc\theta_1)^2 + f_0^2 - a^2 + b^2 s^2 \theta_1,$ $m_3 = u - e - bc\theta_2, \, m_2 = u - e - bc\theta_1,$ $m_1 = b(s\theta_1 - s\theta_1),$ $m_0 = b(u - e)(c\theta_2 - c\theta_1),$ $n_2 = 2(u - e) - b(c\theta_1 + c\theta_3),$ $n_1 = b(s\theta_1 - s\theta_3),$ and $n_0 = b(u - e)(c\theta_3 - c\theta_1).$ The parallel robot has only a translation motion, so the rotation around the $Z_O$ axis is the only factor to determine the orientation of the MPM, i.e., $\phi = \phi_m$. Referring to FIGS. 1 and 2, one can derive the position of the mobile platform to be:

$$p = b + R^B p \quad (13)$$

with $$b = \overrightarrow{OB} = [x_m - l_b c\phi_m \, y_m - l_b s\phi_m \, h]^T, \quad (14)$$

and $$R = \begin{bmatrix} c\phi_m & -s\phi_m & 0 \\ s\phi_m & c\phi_m & 0 \\ 0 & 0 & 1 \end{bmatrix}, \quad (15)$$

is the rotation matrix of the moving frame B regarding to the fixed frame O.

Regarding the differential kinematics analysis, let the vector for the output velocities of the moving platform be $\dot{x} = [\dot{x} \, \dot{y} \, \dot{z} \, \dot{\phi}]^T$, and the vector of input joint rates be represented by $\dot{q} = [\dot{\theta}_1 \, \dot{\theta}_r \, \dot{\theta}_1 \, \dot{\theta}_2 \, \dot{\theta}_3]^T$. Differentiating eq. (13) with respect to time, leads to:

$$\dot{p} = \dot{b} + \dot{R}^B p + R^B \dot{p} \quad (16)$$

Also, let $\dot{q}_p = [\dot{\theta}_1 \, \dot{\theta}_2 \, \dot{\theta}_3]^T$ to be the vector of actuated joint rates for the parallel robot. Taking the derivative of both sides of equations (9) through (11) with respect to time and rewriting them into a matrix form yields:

$$A^B \dot{p} = B\dot{q}_p \quad (17)$$

The 3×3 forward and inverse Jacobian matrices A and B of the parallel robot can be written as:

$$A = \begin{bmatrix} a_{11} & a_{12} & a_{13} \\ a_{21} & a_{22} & a_{23} \\ a_{31} & a_{32} & a_{33} \end{bmatrix}, B = \begin{bmatrix} b_{11} & 0 & 0 \\ 0 & b_{22} & 0 \\ 0 & 0 & b_{33} \end{bmatrix}, \quad (18)$$

with $a_{11} = x_p, \, a_{12} = y_p + u - e - bc\theta_1, \, a_{13} = z_p - bs\theta_1,$ $a_{21} = x_p - u + e + bc\theta_2, \, a_{22} = y_p, \, a_{23} = z_p - bs\theta_2,$ $a_{31} = x_p, \, a_{32} = y_p - u + e + bc\theta_3, \, a_{33} = z_p - bs\theta_3,$ $b_{11} = -b[(y_p + u - e)s\theta_1 - z_p c\theta_1],$ $b_{22} = b[(x_p - u + e)s\theta_2 - z_p c\theta_2],$ $b_{33} = b[(y_p - u + e)s\theta_3 - z_p c\theta_3]$ It can be derived from eq. (17) that when the parallel robot is away from the singularity:

$$^B\dot{p} = J_p \dot{q}_p, \quad (19)$$

where $J_p = A^{-1} B$ is the Jacobian matrix of a 3-RRPaR parallel robot. By substituting equations (14), (15) and (19) into eq. (16), and considering eq. (1), this will give:

$$\dot{x} = J\dot{q} \quad (20)$$

Defining J 4×5 to be the Jacobian matrix of the MPM, relating the output velocities to the actuated joint rates allows rewriting as shown in the following matrix:

$$J = \begin{bmatrix} J_{11} & J_{12} & & & \\ J_{21} & J_{22} & & RA^{-1}B & \\ 0 & 0 & & & \\ -r/d & r/d & 0 & 0 & 0 \end{bmatrix}, \quad (21)$$

with $J_{11} = \left(\frac{1}{2} + \frac{y_p}{d}\right) rc\phi_m - \frac{r}{d} s\phi_m(l_b - x_b),$ $J_{12} = \left(\frac{1}{2} - \frac{y_p}{d}\right) rc\phi_m + \frac{r}{d} s\phi_m(l_b - x_b),$ $J_{21} = \left(\frac{1}{2} + \frac{y_p}{d}\right) rs\phi_m + \frac{r}{d} c\phi_m(l_b - x_b),$ $J_{22} = \left(\frac{1}{2} - \frac{y_p}{d}\right) rs\phi_m + \frac{r}{d} c\phi_m(l_b - x_b).$ Taking differentiation equation (19) with respect to time gives:

$$\ddot{x} = \dot{J}\dot{q} + J\ddot{q} \quad (22)$$

Solving equation (20) leads to:

$$\dot{q} = J^\dagger \dot{x} + (I_{5\times 5} - J^\dagger J)\dot{q}_s, \quad (23)$$

where $J^\dagger = J^T(JJ^T)^{-1}$ the generalized pseudo inverse of J, and $\dot{q}_s \in \Re^{5\times 1}$ is an arbitrary vector, which can be chosen to achieve a secondary task.

With respect to kinematic singularity characterization, the robot Jacobian allows motion and force transformation from the actuators to the End Effector, so that the forces demand at a given point on the trajectory need to be continuously checked for possible violation of the preset limits as the robot moves close to singularity. The condition number of the Jacobian is used as a local performance index for evaluating the velocity, accuracy, and rigidity mapping characteristics between the joint variables and the moving platform. With respect to a detailed characterization of robot singularities, from equation (16) it is clear that singularity in the MPM structure occurs in the following cases:

1$^{st}$ case: $|A|=0$, and $|B|\neq 0$. This corresponds to a type-1 singularity.
2$^{nd}$ case: $|A|\neq 0$, and $|B|=0$. This is a type-2 singularity.
3$^{rd}$ case: $|A|=0$, and $|B|=0$. This is a type-3 singularity for which both the determinant of A and B will equal to zero.

These cases are programmed to be calculated during running the simulation.

Regarding redundancy resolution through joint limits and singularity avoidance, to include a secondary task criterion by a performance index $g(q)$, $\dot{q}_2$ in equation (22) is chosen to be $\dot{q}_s=\pm k\nabla g(q)$, where k is a positive real number and $\nabla g(q)$ the gradient of $g(q)$, where a positive sign indicates that the criterion is to be maximized and a negative sign indicates minimization. To avoid joint limits we chose $\dot{q}_s$ as follows:

$$\dot{q}_{s1}=(q_{max}-q)W(q_{min}-q) \quad (24)$$

where $$W = \frac{1}{2}(q_{max}-q_{min}) \quad (25)$$

The related criterion to avoid the singularity is to maximize the manipulability, i.e., we choose $\dot{q}_s$ as follows:

$$\dot{q}_{s2}=\sqrt{\det(JJ^T)}W_s \quad (26)$$

where $W_s$ is weight vector with appropriate dimension. The formula of the augmented function to avoid singularity and joint limits is as follows:

$$\dot{q}_s=\dot{q}_{s1}+\dot{q}_{s2}. \quad (27)$$

Kinematic initialization first involves optimal time trajectory parameterization. Considering the MPM, the task of the robot is to move its end-effector within a limited workspace and time interval. Also, each robot joint has to produce zero rates and accelerations at the ends of the interval of motion. A cycloidal function is chosen to achieve this purpose for modeling the trajectory time (t) from 0 to T, with the normalized time s as $$s = \frac{t}{T},$$

$0 \leq t \leq T$, $0 \leq s \leq 1$.

The cycloidal function is characterized by the relation:

$$q(s) = s - \frac{1}{2\pi}\sin(2\pi s), \quad (28)$$

where the first and second derivatives obtained are:

$$\dot{q}(s)=1-\cos(2\pi s), \quad (29)$$

$$\ddot{q}(s)=2\pi\sin(s) \quad (30)$$

The cycloidal motion and its derivatives are defined within the range (−1, 1). With zero velocity and acceleration at the ends of the interval, i.e., s=0 and s=1, the initial and final joint values be detailed as $q^I$ and $q^F$. The maximum velocity for the motion of joint j is attained at the center of the interval, i.e. s=0.5, the maximum being $\dot{q}_{max}=\dot{q}(0.5)=2$, so that:

$$(\dot{q}_j)_{max}(s) = \frac{2}{T}|q_j^F - q_j^I|. \quad (31)$$

In the same way, it can be shown that the acceleration of joint j allows its maximum and minimum values at s=0.25 and s=0.75, the maximum being $\ddot{q}_{max}=\ddot{q}(0.25)=\ddot{q}(0.75)=2\pi$, and hence:

$$(\ddot{q}_j)_{max}(s) = \frac{2\pi}{T^2}|q_j^F - q_j^I|. \quad (32)$$

And finally, the maximum jerk of joint j is achieved at s=0.0, and s=1.0, the maximum being $$\dddot{q}_{max} = \dddot{q}(0)$$
$$= \dddot{q}(1)$$
$$= 4\pi^2.$$

Thus:

$$(\dddot{q}_j)_{max}(s) = \frac{4\pi^2}{T^3}|q_j^F - q_j^I| \quad (33)$$

The motion of the robot is constrained by the maximum joint velocity, accelerations and jerk that the motors produce. This can be interpreted as:

$$\dot{q}_j \leq (\dot{q}_j)_{motor}, \quad (34)$$
$$\ddot{q}_j \leq (\ddot{q}_j)_{motor},$$
and
$$\dddot{q}_j \leq (\dddot{q}_j)_{motor}.$$

This means that the strongest constraint among $(\dot{q}_j)_{motor}$, $(\ddot{q}_j)_{motor}$, and $(\dddot{q}_j)_{motor}$ limits the minimum-time trajectory of joint j, which means that:

$$T_j = \text{Max}\left\{\frac{2|q_j^F - q_j^I|}{(\dot{q}_j)_{motor}}, \sqrt{\frac{2\pi}{(\ddot{q}_j)_{motor}}|q_j^F - q_j^I|}, \left(\frac{4\pi^2}{(\dddot{q}_j)_{motor}}|q_j^F - q_j^I|\right)^{1/3}\right\} \quad (35)$$

The overall minimum-time trajectory (for all the five joints together of the MPM) is written as:

$$T_{Min}=\text{Max}\{T_1,T_2,T_3,T_4,T_5\} \quad (36)$$

Thus, the resulting minimum-time trajectory, which is characterized by joints position, velocity, and acceleration, is obtained as:

$$q(t) = q^I + (q^F - q^I)\left(\frac{t}{T_{Min}} - \frac{1}{2\pi}\sin\left(2\pi\frac{t}{T_{Min}}\right)\right), \quad (37)$$

$$\dot{q}(t) = \frac{q^F - q^I}{T_{Min}}\left(1 - \cos\left(2\pi\frac{t}{T_{Min}}\right)\right)$$

$$\ddot{q}(t) = \frac{q^F - q^I}{T_{Min}^2}2\pi\sin\left(2\pi\frac{t}{T_{Min}}\right).$$

Figure 6:
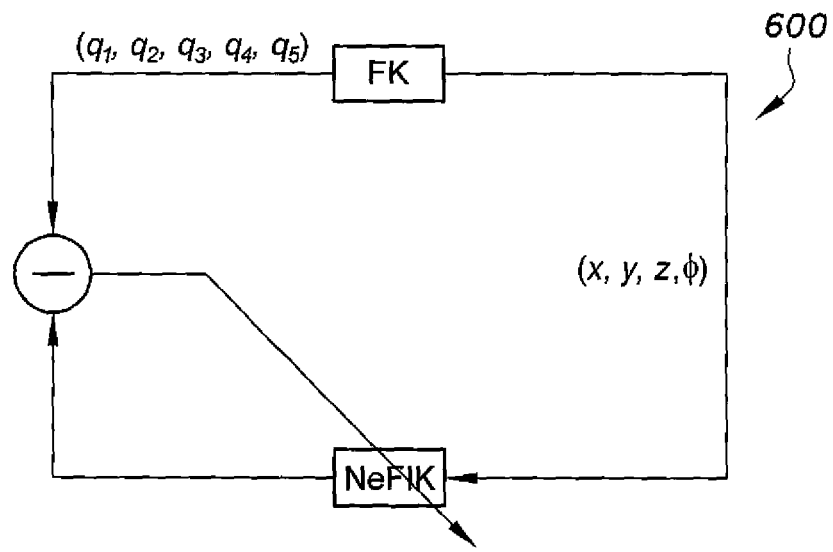
FIG. 6 is a block diagram showing the FK solution for learning of a NeFIK module in a control method for mobile parallel manipulators according to the present invention.

Neuro-Fuzzy Inverse Kinematics (NeFIK) can assist in solving the inverse kinematics problem, which is the problem of finding the joint coordinates ($q_1$, $q_2$, $q_3$, $q_4$, $q_5$), from Cartesian coordinates (x, y, z, ϕ) where the starting and ending Cartesian positions of the manipulator are specified in the workspace of the robot. NeFIK is proposed to be used in the present method for resolving the redundancy of the inverse kinematic problem. The NeFIK is trained to produce joint position in a preferred configuration. The training dataset is generated with the aforementioned forward kinematic (FK) equations of the manipulator. The use of the FK to the learning of the NeFIK module is shown as system circuit 600 in FIG. 6. A set of derivatives of ($q_1$, $q_2$, $q_3$, $q_4$, $q_5$) is used to construct the true derivatives (x, y, z, ϕ, $x_n$), and thus to get an error on which to apply the back-propagation algorithm. $\dot{x}_n$ related to $\dot{q}_s$ is added to remove the redundancy of the system.

NeFIK is a multi-layer feed-forward adaptive network. The first layer is a two input layer, characterizing the Cartesian position crisp values. The last layer is a three output-layer characterizing the corresponding crisp joint values. NeFIK involves three hidden layers. The first one is the fuzzification layer, which transfers the crisp inputs to linguistic variables through sigmoidal transfer functions. The second is the rule layer, which applies the Product t-norm to produce the firing strengths of each rule. This is followed by a normalization layer. The training rule option is the Levenberg-Marquard version of the gradient back propagation algorithm. This choice allows speeding up the learning process substantially, with less iteration as compared to standard back-propagation (e.g., gradient descent). To construct NeFIK, the forward kinematic equations are applied. Its learning is obtained through 400 samples, among which 320 are considered for training, whereas the testing and validation datasets are each obtained using 10 entry samples. Training performance for NeFIK has been shown to achieve a very small root mean square error (RMSE), less than $10^{-3}$ in less than 10 epochs. It should be understood that the configuration used for the learning is determined among infinitely many solutions that exist for each input. The model derived by the NeFIK structure is used to process trajectories motion of the MPR where the motion is subjected to the parallel mechanism only, and where the motion is a combined motion of both the mobile and parallel structures.

The robot dynamic model is developed using a Lagrangian formalism, which includes actuators and friction models. This model allows closed-form expression of joint rates and accelerations characterizing the motion resulting from joint torques. Using the minimum-time trajectory of equation (36) and an inverse dynamic solution, one can write:

$$\tau = \left[\frac{1}{T_{Min}^2}\left(2\pi\sin\left(2\pi\frac{t}{T_{Min}}\right)\right)D(q) + \right. \quad (38)$$

$$\frac{1}{T_{Min}}\left[\left(1 - \cos\left(2\pi\frac{t}{T_{Min}}\right)\right)(C(q,\dot{q}) + F_V) + \right.$$

$$\left.\left.F_c sgn\left(1 - \cos\left(2\pi\frac{t}{T_{Min}}\right)\right)\right]\right](q^F - q^I)^T$$

Equation (37) allows for computation of the torques τ corresponding to the joint motion (q, q̇, q̈) and then projection of T onto the admissible domain of torque limits (as provided by the manufacturer), i.e.:

$$\tau_i = \text{Max}(\text{Min}(\tau_i, \tau_{iMax}), \tau_{iMin}) \quad (39)$$

Regarding dynamic modeling, in order to get the dynamic modeling of the hybrid MPM system the Lagrange method is used. This can be done by applying Lagrange equation to the mechanical systems with either holonomic or nonholonomic constraints, along with the equations of constraint and their first and second derivatives involved into the equations of motion to produce the number of equations that is equal to the number of unknowns.

Considering ξ, which contains the variables of the mobile platform, let the generalized coordinates be $\zeta = [\xi^T \theta_1 \theta_2 \theta_3 x y z]^T$. Notice that ζ contains all the variables of both the mobile platform and the parallel manipulator. In order to use the approach of Lagrangian equations for the derivation of the dynamic equations of the MPM, the kinetic and potential energies for all components of the manipulator must be expressed in terms of the chosen generalized coordinates and their derivatives. In this way we will get a number of equations equal to the number of the generalized coordinates (11 equations), which aids in obtaining the dynamic model.

Dynamic model analysis applies conventional simplifications, while also addressing the mechanical structure of the MPM 10. With respect to a 3-RRPaR parallel manipulator, the upper parallelogram links cause the complexity of the dynamic model. These connecting links can be made of lightweight materials, such as aluminum alloy. Because of the lightweight assumption, the dynamic modeling can be simplified by the following hypothesis. The mass of each upper link is equally divided into two portions and placed at its two extremities, i.e., one half at its lower extremity (the end of lower link) and the other half at its upper extremity (moving platform). Thus, the rotational inertias of the upper links can be neglected. Also, the castor of the mobile platform can be made to be very light, so its dynamics are neglected.

Assume that the mobile robot cannot move in the lateral direction, i.e., it satisfies the conditions of pure rolling and non-slipping. Then, regarding constraint equations, the three constraints for the mobile platform can be represented by equation (2).

Another three constraint equations for the MPM can be derive from eq. (8), i.e.:

$$\Gamma_4 = x_p^2 + (y_p + u - e - bc\theta_1)^2 + (z_p bs\theta_1)^2 - a^2,$$

$$\Gamma_5 = (x_p - u + e + bc\theta_2)^2 + y_p^2 + (z_p - bs\theta_2)^2 - a^2,$$

$$\Gamma_6 = x_p^2 + (y_p - u + e + bc\theta_3)^2 + (z_p - bs\theta_3)^2 - a^2, \quad (40)$$

With respect to the dynamic equations, because the mobile platform moves on a horizontal plane, there is no change in the potential energy $U_m$ of the mobile platform. Thus, the kinetic energy can be calculated by:

$$T_m = \frac{1}{2}m_c(\dot{x}_m^2 + \dot{y}_m^2 + l_a^2\dot{\phi}_m^2) + \frac{1}{2}I_c\dot{\phi}_m^2 + \frac{1}{2}I_f\dot{\theta}_l^2 + \frac{1}{2}I_f\dot{\theta}_r^2 \quad (41)$$

where $m_c$ is the mass of cart including the mobile platform, the base platform and three actuators for the parallel robot, while without the two driving wheels and rotors of the two motors; $I_c$ is the moment of inertia of the mobile cart about a vertical axis through the mass center A, and $I_f$ denotes the moment of inertia of each driving wheel and the motor rotor about the wheel axis. The potential energy of the parallel manipulator is:

$$U_p = (m_p + 3m_a)z_p g + \sum_{i=1}^{3}\left(\frac{1}{2}m_b + m_a\right)bgs\theta_i, \quad (42)$$

where, $m_b$, $m_a$, and $m_p$, represent the mass of lower link, each connecting rod of upper link, and the moving platform, respectively.

The kinetic energy for the parallel manipulator consists of kinetic energy of the upper moving platform, the upper links, and the connecting rods, and is derived to be:

$$T_P = \frac{1}{2}(m_p + 3m_a)(\dot{x}^2 + \dot{y}^2 + \dot{z}^2) + \frac{1}{2}I_p\dot{\phi}_m^2 + \frac{3}{2}(m_b + m_a)(\dot{x}_m^2 + \dot{y}_m^2 + (l_b + e)^2\dot{\phi}_m^2) + \sum_{i=1}^{3}\frac{1}{2}\left(\frac{1}{3}m_b + m_a\right)b^2\dot{\theta}_i, \quad (43)$$

where, $I_p$, denotes the moment of inertia of the moving platform about a vertical axis through its mass center. Thus, the Lagrange function for the MPM becomes:

$$L = T + T_p - U_m - U_p \quad (44)$$

The constrained dynamics for the entire system of the MPM can be determined by:

$$\frac{d}{dt}\left(\frac{\partial L}{\partial \dot{\zeta}_j}\right) - \frac{\partial L}{\partial \zeta_j} = Q_j + \sum_{i=1}^{6}\lambda_i \frac{\partial \Gamma_i}{\partial \zeta_j}, \quad (45)$$

$(j = 1, 2, \ldots, 11)$ i.e.:

$$Q_j = \frac{d}{dt}\left(\frac{\partial L}{\partial \dot{\zeta}_j}\right) - \frac{\partial L}{\partial \zeta_j} - \sum_{i=1}^{6}\lambda_i \frac{\partial \Gamma_i}{\partial \zeta_j},$$

$(j = 1, 2, \ldots, 11)$ where $Q = [0\ 0\ 0\ \tau_l\ \tau_r\ \tau_1\ \tau_2\ \tau_3\ 0\ 0\ 0]^T$ are the generalized forces under the assumption that no external forces/torques are exerted. Note that $\lambda_i$ ($i=1, 2, \ldots, 6$) are Lagrange multipliers associated with the constraints equations (2) and (22). The Lagrange multipliers can be calculated from the first set of linear equations of equation (33) for $j=1, 2, 3, 9, 10,$ and $11$. Once the Lagrange multipliers are found, the actuated torques $\tau=[\tau_l\ \tau_r\ \tau_1\ \tau_2\ \tau_3]^T$ can be solved from the second set of equations of equation (27) for $j=4, 5, 6, 7,$ and $8$, which can be written into a matrix form:

$$H(\zeta)\ddot{q} + V(\zeta,\dot{\zeta})\dot{q} + G(\zeta) = \tau + C(\zeta)\lambda. \quad (46)$$

Matlab software is used to get complete expressions of eq. (46) as follows. The dynamic parameters are: $m_a=0.2$ kg, $m_b=0.5$ kg, $m_p=0.8$ kg, $m_c=7.5$ kg, $I_p=0.00034$ kg·m², $I_c=0.13982$ kg·m², and $I_f=0.00045$ kg·m². Solving the augmented Lagrange equation gives $Q_i = \lambda_4 g_{1j}(\zeta) + \lambda_5 g_{2j}(\zeta) + \lambda_6 g_{4j}(\zeta)$, where $i=1, 2, 3, \ldots, 11$. $H(\zeta)=\text{diag}([A_1, A_2, A_4, A_7, A_{10}]) \in \Re^{5\times 5}$ is the symmetric and positive definite inertial matrix. $A_1 = A_2 = 9/20000$, $A_4 = A_7 = A_{10} = 11/750$. $V(\zeta,\dot{\zeta}) \in \Re^{5\times 5}$ is the centripetal and Coriolis forces matrix, here equal to zero. $G(\zeta)=[0; 0; A_5; A_8; A_{11}] \in \Re^{5\times 1}$ represents the vector of gravity forces, $A_5 = 0.8829\ c\theta_1$, $A_8 = 0.8829\ c\theta_2$, $A_{11} = 0.8829\ c\theta_3$, while $\lambda = [\lambda_1\ \lambda_2\ \ldots\ \lambda_6] \in \Re^{6\times 1}$ denotes the vector for Lagrange multipliers. Thus:

$$\lambda = \begin{bmatrix} f_1 & f_2 & f_3 \\ f_5 & f_6 & f_7 \\ f_9 & f_{10} & f_{11} \end{bmatrix}^{-1} \begin{bmatrix} f_4 \\ f_8 \\ f_{12} \end{bmatrix},$$

and, $f_1 = -0.4\ s\phi_m c\theta_1 = 0.08\ s\phi_m - 0.2\ c\phi_m + 2(x_m - x)$ $f_2 = -0.28\ c\phi_m - 0.4 c\phi_m c\theta_2 + 2(x_m - x)$ $f_3 = 0.08\ s\phi_m + 0.4\ s\phi_m c\theta_3 - 0.2\ c\phi_m + 2(x_m - x)$ $f_4 = 1.4\ddot{x}$ $f_5 = 2(y_m - y) - 0.2\ s\phi_m + 0.08\ c\phi_m + 0.4 c\phi_m c\theta_1$ $f_6 = 2(y_m - y) - 0.28\ s\phi_m - 0.4 s\phi_m c\theta_2$ $f_7 = 2(y_m - y) - 0.2\ s\phi_m - 0.08\ c\phi_m + -0.4 c\phi_m c\theta_3$ $f_8 = 1.4\ \ddot{y}$ $f_9 = -2z + 0.4 + 0.4\ s\theta_1$ $f_{10} = -2z + 0.4 + 0.4\ s\theta_2$ $f_{11} = -2z + 0.4 + 0.4\ s\theta_3$ $f_{12} = 1.4\ \ddot{z} + 13.734$ $$C(\zeta) = \begin{bmatrix} 000 & 0 & 0 & 0 \\ 000 & 0 & 0 & 0 \\ 000 & -A_3 & 0 & 0 \\ 000 & 0 & 0 & -A_9 \end{bmatrix} \in \Re^{5\times 6} \text{ is the parameter matrix for } \lambda.$$

$A_3 = 0.4 s\theta_1 s\phi_m(x - x_m) - 0.4\ s\theta_1 c\phi_m(y + y_m) + 0.016\ s\theta_1 + 0.4 c\theta_1 z - 0.08 c\theta_1$ $A_6 = 0.4 s\theta_2 c\phi_m(x - x_m) + 0.4\ s\theta_2 s\phi_m(y - y_m) + 0.056\ s\theta_2 + 0.4 c\theta_2 z - 0.08 c\theta_2$ $A_9 = -0.4\ s\theta_3 s\phi_m(x - x_m) + 0.4\ s\theta_3 c\phi_m(y - y_m) + 0.016\ s\theta_3 + 0.4 c\theta_3 z - 0.08 c\theta_3.$ Recalling equation (20), $\dot{q} = J\dagger\dot{x} + (I_{5\times 5} - J\dagger J)\dot{q}_s$. Let $J_n \in \Re^{5\times 1}$ be the normalized base of $n(J)$ which is the null space of $J$. Then we have:

$JJ_n = 0_{4\times 1}, J_n^T J_n = 1,$ $$J_n^T J\dagger = 0_{1\times 4}, J_n J_n^T = I_{5\times 5} - J\dagger J \quad (47)$$

By definition of $x_n = J_n^T \dot{q}_s$, so that it can be shown that:

$\dot{q} = J\dagger\dot{x} + J_n\dot{x}_n$ $$\ddot{q} = J\dagger\ddot{x} - J\dagger\dot{J}J\dagger\dot{x} + J_n\ddot{x}_n - J\dagger\dot{J}J_n\dot{x}_n \quad (48)$$

With the definition of $x_E = [x^T x_n^T]^T$, and $J_E^\dagger = [J^\dagger J_n]$, then substituting eq. 5.2 into equation (28), we can get the derivation of the dynamic equations described in Cartesian space, which is described by the following equation:

$$\bar{H}(\zeta)\ddot{x}_E + \bar{V}(\zeta,\dot{\zeta})\dot{x}_E + \bar{G}(\zeta) = \bar{\tau}, \quad (49)$$

where $\bar{H}(\zeta) = J_E^{\dagger T} H(\zeta) J_E^\dagger,$ $\bar{V}(\zeta,\dot{\zeta}) = J_E^{\dagger T}[V(\zeta,\dot{\zeta}) - H(\zeta)J^\dagger \dot{J}J_E^\dagger,$ $$\overline{G}(\zeta) = J_E^{\dagger T}[G(\zeta) - c(\zeta)\lambda], \text{ and}$$

$$\overline{\tau} = J_E^{\dagger T} \tau. \quad (49)$$

Regarding discrete time dynamic model, from a state-space form of the continuous-time dynamic model of the MPM we obtain the approximate state space discrete-time model. By deleting the time index and the contact forces, from equation (42) we obtain:

$$\ddot{x}_E = \overline{H}^{-1}(\zeta)\overline{\tau} - \overline{H}^{-1}(\zeta)(\overline{V}(\zeta,\dot{\zeta})\dot{x}_E + \overline{G}(\zeta)) \quad (50)$$

Using the state $x_1$, and its time derivative $x_2$, such that $x_1 = x_E$ and $x_2 = \dot{x}_E$ i.e., $x = [x_1^T \ x_2^T]^T$, equation (47) is rewritten as:

$$\overline{H}(\zeta)\dot{x}_2 + \overline{V}(\zeta,\dot{\zeta})x_2 + \overline{G}(\zeta) = \overline{\tau} \quad (51)$$

Also, equation (48) can be transformed to the following form:

$$\dot{x} = \begin{bmatrix} 0_{5\times 5} & I_{5\times 5} \\ 0_{5\times 5} & 0_{5\times 5} \end{bmatrix} x - \begin{bmatrix} 0_{5\times 1} \\ \overline{H}^{-1}(\zeta)(\overline{V}(\zeta,\dot{\zeta})x_2 + \overline{G}(\zeta)) \end{bmatrix} + \begin{bmatrix} 0_{5\times 5} \\ \overline{H}^{-1}(\zeta) \end{bmatrix} \overline{\tau} \quad (52)$$

To obtain the discrete time dynamic model of the MPM, equation (49) is expressed as follows:

$$\dot{x} = Fx - D(x) + B(x)\overline{\tau} \quad (53)$$

where $$F = \begin{bmatrix} 0_{5\times 5} & I_{5\times 5} \\ 0_{5\times 5} & 0_{5\times 5} \end{bmatrix}, \quad (54)$$

$$D(x) = \begin{bmatrix} 0_{5\times 1} \\ \overline{H}^{-1}(\zeta)(\overline{V}(\zeta,\dot{\zeta})x_2 + \overline{G}(\zeta)) \end{bmatrix},$$

and $$B(x) = \begin{bmatrix} 0_{5\times 5} \\ \overline{H}^{-1}(\zeta) \end{bmatrix}.$$

By defining the sampling period as $h_k$, such that $h_k < t < h_{k+1}$ and $\tau_{k=1}^N h_k = T$, with being the total traveling time and the robot state is defined between two sampling points k and k+1 as:

$$x(t) = x(h_k), \text{ for } k = 1, 2, \ldots, N. \quad (55)$$

The discrete time model to model equation (50) is written as:

$$x_{k+1} = F_d(h_k)x_k - D_d(x_k, h_k) + B_d(x_k, h_k)\overline{\tau}_k \quad (56)$$

where $F_d$, $D_d$ and $B_d$ are the discrete equivalents to F, D, and B matrices, and described below.

$$F_d(h_k) = F_d(k+1, k) \quad (57)$$
$$= e^{Fh_k}$$
$$\cong \begin{bmatrix} I_{5\times 5} & h_k I_{5\times 5} \\ 0_{5\times 5} & I_{5\times 5} \end{bmatrix}$$

$$D_d(x_k, h_k) = \int_0^{h_k} F_d(h_k - t)G(h_k - t)(D(x_k))\,dt$$
$$\cong \overline{H}^{-1}(\zeta) \begin{bmatrix} \frac{h_k^2}{2} I_{5\times 5} \\ h_k I_{5\times 5} \end{bmatrix} (\overline{V}(\zeta,\dot{\zeta})x_2 + \overline{G}(\zeta))$$

$$B_d(x_k, h_k) = \int_0^{h_k} F_d(h_k - t)B(x_k)\,dt$$
$$= \begin{bmatrix} \frac{h_k^2}{2} I_{5\times 5} \\ h_k I_{5\times 5} \end{bmatrix} \overline{H}^{-1}(\zeta)$$

So, the discrete time state-space dynamic model of the MPM is rewritten in the final form:

$$x_{k+1} = \begin{bmatrix} I_{5\times 5} & h_k I_{5\times 5} \\ 0_{5\times 5} & I_{5\times 5} \end{bmatrix} x_k - \begin{bmatrix} \frac{h_k^2}{2} I_{5\times 5} \\ h_k I_{5\times 5} \end{bmatrix} \quad (58)$$
$$\overline{H}^{-1}(\zeta)(\overline{V}(\zeta,\dot{\zeta})x_2 + \overline{H}^{-1}(\zeta)\tau_k + \overline{G}(\zeta))$$

Regarding constraints modeling, the task of robotics simulation requires taking into consideration many constraints, such as the nominal values of kinematic and dynamic parameter (for example, the length of the link, velocities, accelerations, and also nominal torques that the actuators supported). These constraints are defined in joint space and in task space.

The robot constraints include nonholonomic constraints wherein the mobile robot cannot move in the lateral direction, i.e., it satisfies the conditions of pure rolling and non-slipping. Then, the three constraints for the mobile platform can be represented by equation (2).

Dynamic state equations consist of equation (55), which can be rewritten in the following formula:

$$x_{k+1} = f_{d_k}(x_k, \tau_k, h_k) \quad (59)$$

Limits on the intermediate lengths of links are expressed by equation (22), from which the limits of the angles are found utilizing the fact that each angle of the parallel manipulator is between 0.65 and 1.65 radian, and for the mobile platform it is between −10 radian and 10 radian. Singularity avoidance is performed as described above.

Regarding torque limits, another major issue for trajectory planning is not violating the control torque limits. In this research, we assume that the robot torques belong to a bounded set $C \subset \Re^N$, as shown in the following formula:

$$C = \{\tau_k \in \Re^N, \text{ such that: } \tau_{min} \leq \tau_k \leq \tau_{max}, k = 0, \ldots, N-1\} \quad (60)$$

With respect to sampling period limits, since the torque constraints bound indirectly the path traversal time, in order to achieve admissible solution to the optimal control problem, the overall robot traveling time T should not be too small. Also, in order to achieve system controllability, the sampling period must be smaller than the system smallest time mechanical constant between two control times. In this research, time mechanical constant and limits of sampling periods are assumed to be available previously.

Now, H is defined to be the sampling period:

$$H = \{h_k \in \Re^+, \text{ such that: } h_{min} \leq h_k \leq h_{max}\} \quad (61)$$

Task and workspace constraints are basically geometric and kinematic, from which the size and shape of the manipulator workspace is determined. These constraints are expressed by imposing to the end effector (EE) to pass through a set of specified poses. These constraints represent equality constraints and are written for simplicity as:

$$s_1^l(x) = \|p - p_l\| - T_{PassThlp} = 0$$

$$s_2^l(x) = \|\text{vect}(R^T R_l)\| - T_{PassThlR} = 0, l = 1, \ldots L \quad (62)$$

The above inequality constraints are written in the following simplified forms:

$$g_1(x)=q_{min}-\Theta(x) \leq 0, g_2(x)=\Theta(x)-q_{Max} \leq 0$$

$$g_3(\tau)=\tau_{Min}-\tau \leq 0, g_4(\tau)=\tau-\tau_{Max} \leq 0, \quad (63)$$

where $q_{Min/Max}$ and $\tau_{Min/Max}$ are for $(\theta_1, \theta_2, \theta_3)$, all inequality constraints will be noted as $g_j(x, \tau, h) \leq 0, j=1, \ldots, 4$, regardless if they depend only on state, control variables or both. Hence, we turn up with J=12 inequality constraints, 2 L equality constraints (imposed passages), and 6 equality constraints representing state dynamics equations.

To validate the effectiveness of the established dynamic model for the MPM, the dynamic control in task space is implemented by resorting to a model-based controller. Since the number of coordinates in task space is less than that in joint space, the proposed MPM possesses self-motion with one degree of redundancy. In this research, a simple solution is presented to stabilize the redundant robotic system.

Figure 3:
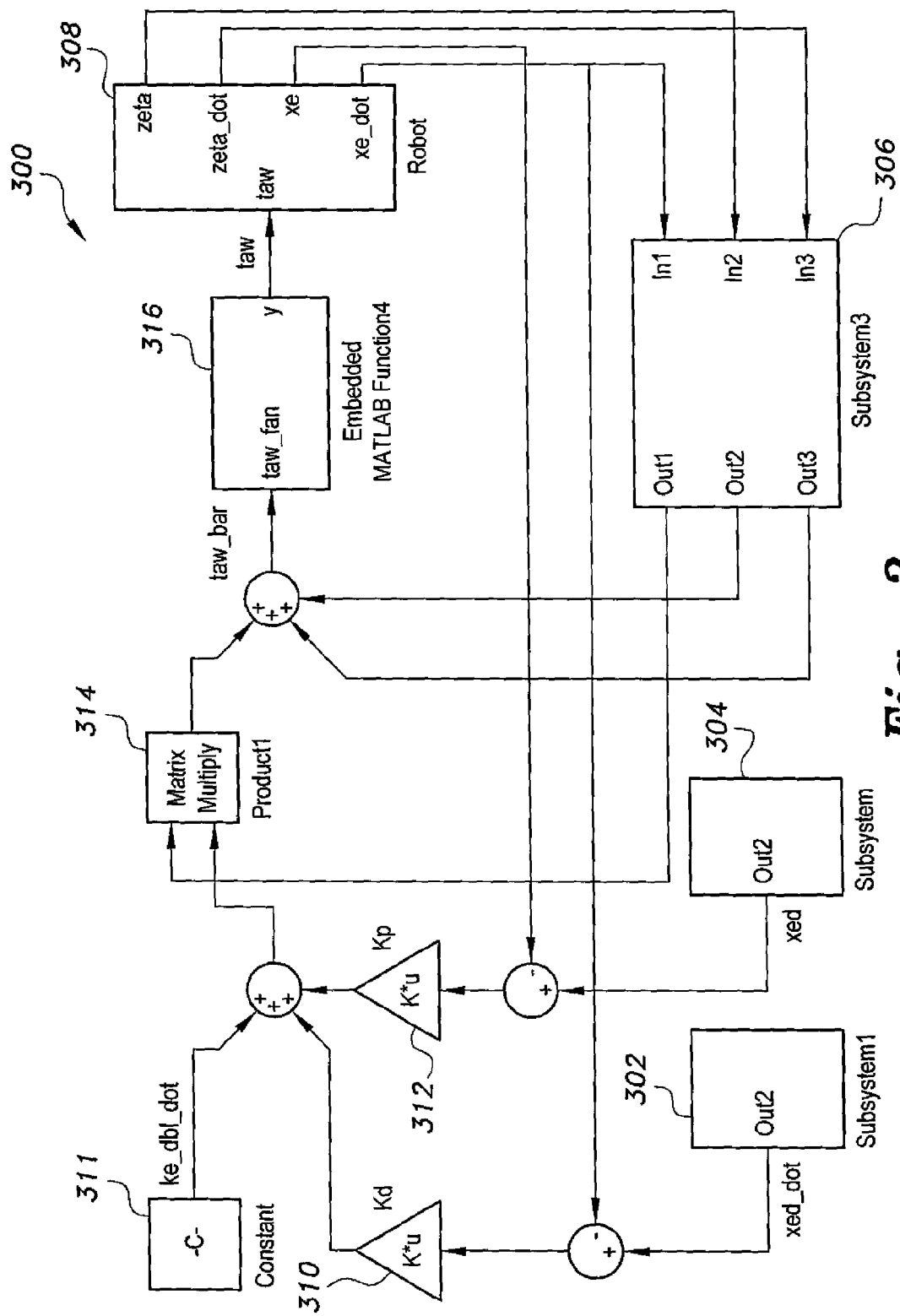
FIG. 3 is a block diagram of a controller that may be used in a control method for mobile parallel manipulators according to the present invention.

In the model-based controller design, the desired trajectories, velocities and accelerations $(x_d, \dot{x}_d, \ddot{x}_d)$ can be determined in advance, and the desired self-motions $x_{nd}, \dot{x}_{nd}$, and $\ddot{x}_{nd}$ can be selected to perform secondary tasks besides the one in task space. Here, the self motion is exploited to optimize the problem of minimizing $\{\dot{q}^T, \ddot{q}\}$, subject to $\dot{x}=J\dot{q}$. The model-based control system 300 is illustrated in the block diagram of FIG. 3 and comprises position and rate control subsystems 302, 304, and 306, gain constants $K_D$ 310 and $K_P$ 312, acceleration bias constant 311, a matrix multiply unit 314 and an angular controller 316 in operable communication with a processor 308 on the robot. Let $x_{Ed}=[x_d^T \, x_{nd}^T]^T$, then the error system can be defined by:

$$e=x_{Ed}-x_E 0 \quad (64)$$

The adopted model-based controller is expressed in terms of positive definite constant gain matrices:

$$\tau=J_E^T[H(\ddot{x}_{Ed}+K_D\dot{e}+K_Pe)+V\dot{x}_E+G] \quad (65)$$

where $K_D$ and $K_P$ are the positive definite constant gain matrices. The error equation can then be generated accordingly as:

$$\ddot{e}+K_D\dot{e}+K_Pe=0. \quad (66)$$

Regarding simulation results for model validation, the dynamic control algorithm is implemented in task space such that the moving platform can track a desired trajectory, and the simulations are carried out via Matlab and Simulink software. Two desired trajectories are selected such that no kinematic singularity is encountered. The two trajectories consisted of a linear locus and a parabola-like special locus. The heading angle is assigned as $\phi_d=0$ in the first curve, and 0.1 t in the second. The architectural parameters of the designed MPM are: a=0.2 m, b=0.2 m, e=0.16 m, u=0.12 m, d=0.4 m, h=0.2 m, r=0.08 m, $l_a$=0.2 m and $l_b$=0.1. The dynamic parameters are: $m_a$=0.2 kg, $m_b$=0.5 kg, $m_p$=0.8 kg, $m_c$=7.5 kg, $I_p$=0.00034 kg·m², $I_c$=0.13982 kg·m², and $I_f$=0.00045 kg·m². In the simulation, all parameters are supposed to be accurate enough. The actuated joint angles are initialized to be at home position. Additionally, the simulation time interval is selected as 10 seconds, and the gain matrices are selected as $K_D$=diag $\{10\}$ and $K_P$=diag $\{25\}$. The simulation revealed that both the position and heading angular errors can be eliminated by the model-based controller employing the present method. Moreover, if proper gains are chosen, the initial errors can be decreased rapidly.

Two extra simulations are carried out to see the effect of choosing $\dot{q}_s$. In the first simulation, $\dot{q}_s$ is put equal to a vector of 0.001 s, and in the second simulation, to 0.0001. In each case, we calculate the condition number of the Jacobean matrix J and plot it with time. Simulation results revealed that the value of 4, affects the condition number of J, and that the condition number is increasing highly as time increases, while it becomes stable around 1.8, which indicates good behavior. It should be noticed that by combining a mobile platform with a parallel robot, the problem of stability may occur, since in some postures the external forces would cause the manipulator to topple. In addition, regarding accurate navigation of the MPM, the odometric error containing both systematic and nonsystematic components should be taken into account for practical applications.

In general, any cost function with a physical sense can be optimized, and in robotics, several criteria have been implemented to obtain control optimization problem. The cost function can be defined according to task and planning objectives. The general objective function for a robot controlled in discrete time can be written in the following formula (P1):

$$E_d = F[x_N] + \sum_{k=0}^{N-1} L[x_k, \tau_k], \quad (67)$$

where $F[x_N]$ is a cost associated to the final state, whereas the second term in the right-hand side of the equation is related to the instantaneous state and control input variables (i.e., at time $t_k$=kh). The robot state and input vectors $x_k$ and $\tau_k$ are related by the discrete dynamic model represented by equation (39).

The Minimum Time Control of robotic systems corresponds to F=0, L=1. In the mentioned criterion, (P1) had been widely considered by several authors. This is of interest, considering production targets in industrial mass production processes. But, the major disadvantage of this control method is its Bang-Bang character, which produces non-smooth trajectories, which hastens the mechanical fatigue of the machine. The sampling periods are defined such that the overall robot traveling time is:

$$T = \sum_{k=0}^{N-1} h_k, \quad (68)$$

where $h_k$ is the robot traveling time between two successive discrete configurations k and k+1, k=0, ..., N-1.

In a first approach to the minimum time control problem, we consider a fixed sampling period h and search for a minimum number N of discretizations of the trajectory. This is equivalent to bringing the robot from an initial configuration $x_s$ to a final imposed one $x_T$ within a minimum number N of steps. For highly nonlinear and coupled mechanical systems, such as the MPM, it is impractical, even by using symbolic calculations.

In a second approach to the minimum time control problem, we consider a fixed number of discretizations N and vary the sampling time $h_k$. This means that the robot moves from an initial configuration $x_s$ to a final imposed one $x_T$ within a fixed number of steps N while varying the sampling period's $h_k$.

The minimum energy control problem is formulated as the case, while minimizing electrical energy cost, the robot moves from a starting point $x_s$ to a target point $x_T$. Thus, the governing criterion is characterized by the relation:

$$F=0 \text{ and } L=\Sigma_{k=0}^{N-1}\tau_k^T R\tau_k \quad (69)$$

Using this criterion, or in general, using quadratic criterion, such as kinetic-energy criterion, ($L=\Sigma_{k=0}^{N-1} v_k^T R v_k$, v is the velocity vector), the obtained trajectory is smoother, as it steers away from discontinuous trajectories.

The redundancy resolution and singularity avoidance control problem is addressed as follows. Because of the redundancy robots, the Jacobian J is not a square matrix. The kinematic redundancy might be used to solve the inverse kinematics by optimizing a secondary criterion.

An objective functional for the considered problem is developed, taking into consideration the performance index as it relates to energy consumption, traveling time, and singularity avoidance. For time criterion, as shown in the preceding, there are two basic ways to perform optimization. The first one fixes the sampling period h and searches for a minimum number N of discretizations. The second one fixes the number of discretizations N and varies the sampling periods $h_k$. In this research, the number of sampling periods from an initial feasible kinematic solution is estimated. Then the sampling periods and the actuator torques are considered as control variables. In continuous-time, the constrained optimal control problem can be stated as follows.

Choosing all admissible control sequences $\tau(t) \in C$ and $h \in H$, which cause the robot to move from an initial state $x(t_o)=x_S$ to a final state $x(t_T)=X_T$, find those that minimize the cost function E:

$$E = \min_{\substack{\tau(t) \in C \\ t_o, t_T \in H}} \int_{t_o}^{t_T} \left\{ \left[ \tau(t) U \tau^T(t) + t_1 + \frac{1}{2} x_2(t) Q x_2^T + \delta\omega(x_1(t)) \right] dt \right\}, \quad (70)$$

Subject to constraints (53)-(60), with C, H, U, Q, t and δ being, respectively, the set of admissible torques, the set of admissible sampling periods, electric energy, kinetic energy, and time weights, and a weight factor for singularity avoidance, the corresponding discrete-time optimal control problem consists of finding the optimal sequences ($\tau_0, \tau_2, \ldots, \tau_{N-1}$) and ($h_0, h_2, \ldots, h_{N-1}$), allowing the robot to move from an initial state $x_0=x_S$ to a target state $x_N=x_T$, while minimizing the cost $E_d$:

$$\min_{\substack{\tau(t) \in C \\ t_o, t_T \in H}} E_d = \left\{ \sum_{k=0}^{N-1} [\tau_k U \tau_k^T + t + x_{2k} Q x_{2k}^T + \delta\omega(x_{1k}(t))] h_k \right\} \quad (71)$$

subject to:

$x_{k+1} = f_{d_k}(x_k, \tau_k, h_k), k=0, \ldots, N-1,$ $g_j(x_k, \tau_k, h_k) \leq 0, j=1, \ldots, J, k=0, \ldots, N-1,$ and $s_i(x_k)=0, i=1, \ldots, 2L, k=0, \ldots, N.$ In the Augmented Lagrangian Approach for solving the stated Minimum Time-Energy Singularity-Free Trajectory Planning (MTE-SF-TP) n constrained on-linear control problem, there are two basic approaches. These are dynamic programming, and variational calculus through the Maximum principle of Pontryagin. In the dynamic programming is used to find a global optimal control. The optimal feedback control is through Hamilton-Jacobi-Bellman partial differential equations (HJB-PDE).

For linear-quadratic regulator problems, the HJB-PDE can be solved analytically or numerically by solving either an algebraic or dynamic matrix Riccati equation. For a general case, however, the PDE can be solved numerically for very small state dimensions only.

Adding the inequality constraints on state and control variables makes the problem harder. In this research, we propose to use the second approach to solve this problem. The Augmented Lagrangian (AL) is used to solve the resulting non-linear and non-convex constrained optimal control problem. Powell and Hestens originated independently the method of using the AL. The AL function transforms the constrained problem into a non-constrained one, where the degree of penalty for violating the constraints is regulated by penalty parameters. After that, several authors improved it. Moreover, AL might be convexified to some extent with a judicious choice of the penalty coefficient. This procedure had been previously implemented in several cases of robotic systems. The AL function transforming the constrained optimal control problem into an unconstrained one is written as:

$$L_\mu(x, \tau, h, \lambda, \rho, \sigma) = \sum_{k=1}^{N} [\tau_k^T U \tau_k + t + x_{2k}^T Q x_{2k} + \delta\omega(x_{1k})] h_k + \quad (72)$$

$$\sum_{k=0}^{N-1} \{\lambda_{k+1}^T (x_{k+1} - f_{d_k}(x_k, \tau_k, h_k))\} +$$

$$\sum_{k=0}^{N-1} h_k \left[ \sum_{i=1}^{L-1} \sum_{l=1}^{2} \Psi_{\mu_s}(\sigma_k^i, s_i^l(x_k)) + \sum_{j=1}^{J} \Phi_{\mu_g}(\rho_k^j, g_j(x_k, \tau_k, h_k)) \right] + \sum h_N \Psi_{\mu_s}(\sigma_k^i, s_i^l, (x_k))$$

where the function $f_{d_k}(x_k, \tau_k, h_k)$ is defined by the discrete state eq. (58) at the sampling time k, N is the total sampling number, $\lambda \in R^{12N}$ designates the ajoint (or co-state) obtained from the adjunct equations associated to state equations, $\rho, \sigma$ are Lagrange multipliers with appropriate dimensions associated to equality and inequality constraints, and $\mu_g, \mu_s$ are the corresponding penalty coefficients. The penalty functions adopted here combine penalty and dual methods. This allows relaxation of the inequality constraints as soon as they are satisfied. Typically, these penalty functions are defined by:

$$\psi_{\mu_s}(a, b) = \left(a + \frac{\mu_s}{2} b\right)^T b, \text{ and } \phi_{\mu_g} = \frac{1}{2\mu_g}\{\|\text{Max}(0, a + \mu_g b)\|^2 - \|a\|^2\} \quad (73)$$

where a and b refer, respectively, to Lagrange multipliers and the left-hand side of equality and inequality constraints.

The requirements for the Karush-Kuhn-Tucker first order optimality necessary conditions are that there must exist some positive Lagrange multipliers ($\lambda_k, \rho_k$), unrestricted sign multipliers $\sigma_k$, and finite positive penalty coefficients ($\mu_g, \mu_s$), for $x_k, \tau_k, h_k, k=0, \ldots, N$ for there to be a solution to the problem, such that:

$$\frac{\partial L_\mu}{\partial x} = 0, \frac{\partial L_\mu}{\partial \tau} = 0, \frac{\partial L_\mu}{\partial h} = 0, \frac{\partial L_\mu}{\partial \lambda} = 0, \frac{\partial L_\mu}{\partial \rho} = 0, \frac{\partial L_\mu}{\partial \sigma} = 0, \quad (74)$$

and $\rho_k^T g(x, \tau, h) = 0,$ $\sigma_k^T s(x) = 0,$ $g(x, \tau, h) \leq 0$

Application of these conditions allows deriving the iterative formulas to solve the optimal control problem by adjusting control variables and Lagrange multipliers, as well as penalty coefficients and tolerances. However, establishing the necessary conditions entails problems of an intractable complexity, even by using symbolic calculation.

In the constrained linear-decoupled formulation, the major computational difficulty mentioned earlier cannot be solved by performing with the original nonlinear formulation. Instead, it is solved using a linear-decoupled formulation. The present method utilizes the theorem stating that, provided that the inertia matrix is invertible, then the control law in the Cartesian space is defined as:

$$u = \overline{H}(\zeta)v + \overline{V}(\zeta,\dot{\zeta})x_2 + \overline{G}(\zeta) \tag{75}$$

This leads the robot to have a linear and decoupled behavior with a dynamic equation:

$$\dot{x}_2 = v \tag{76}$$

where $v$ is an auxiliary input. This follows simply by substituting the proposed control law of equation (75) into the dynamic model equation (39) to obtain:

$$\overline{H}(\zeta)\dot{x}_2 = \overline{H}(\zeta)v. \tag{77}$$

Since $\overline{H}(\zeta)$ is invertible, it follows that $\dot{x}_2 = v$. This brings the robot to have the decoupled and linear behavior described by the following linear dynamic equation written in discrete form as:

$$x_{k+1} = F_{dk}x_k + B(h_k)(v_k) = f_{d_k}^D(x_k, v_k, h_k) \tag{78}$$

where $$f_{d_k}^D(x_k, v_k, h_k) = \begin{bmatrix} I_{5\times 5} & h_k I_{5\times 5} \\ 0_{5\times 5} & I_{5\times 5} \end{bmatrix} x_k - \begin{bmatrix} \frac{h_k^2}{2} I_{5\times 5} \\ h_k I_{5\times 5} \end{bmatrix} v_k.$$

Notice that this formulation drastically reduces the computations by alleviating the calculation at each iteration of the inertia matrix inverse and its derivatives with respect to state variables, which results in ease of calculation of the co-states. The non-linearity is, however, transferred to the objective function. One problem of this formula, which is Euler's method, is less accuracy. In order to improve accuracy, and because the MPM structure contains highly nonlinear equations, as shown above, we use the Adams-Bashforth Formula, given by the following general formula:

$$y_{i+1} = y_i + \frac{h}{2}(3f_i - f_{i-1}) + \frac{5}{12}h^3 f_i'' \tag{79}$$

Applying the Adams-Bashforth Formula of eq. (79) to the dynamic equation (78) gives:

$$x_{1_{k+1}} = x_{1_k} + 1.5h_k x_{2_k} + 0.5h_k x_{2_{k-1}} + \frac{5h_k^3}{12} v_{2_k} \tag{80}$$

$$x_{2_{k+1}} = x_{2_k} + 1.5h_k v_{2_k} + 0.5h_k v_{2_{k-1}} + \frac{5h_k^3}{12} \dot{v}_{2_k} \tag{81}$$

Since it is difficult to get the derivative of $v_k$, and to improve accuracy, the following formulas from numerical differentiation methods are used:

$$\dot{y}_1 = (y_2 - y_1)/h_1 \tag{82}$$

$$\dot{y}_2 = (y_3 - y_1)/2h_2 \tag{83}$$

$$\dot{y}_k = (-y_{k+2} + 8y_{k+1} - 8y_{k-1} + y_{k-2})/12h_k \tag{84}$$

$$\dot{y}_{N-1} = (y_N - y_{N-2})/2h_2 \tag{85}$$

$$\dot{y}_{N-1} = (y_N - y_{N-1})/h_2 \tag{86}$$

Now, the decoupled formulation transforms the discrete optimal control problem into finding optimal sequences of sampling periods and acceleration inputs $h_0, h_2, \ldots, h_{N-1}, v_0, v_2, v_{N-1}$, allowing the robot to move from an initial state $x_0 = x_S$ to a final state $x_N = x_T$, while minimizing the cost function:

$$E_d^D = \underset{\substack{v \in V \\ h_k}}{\text{Min}} \tag{87}$$

$$\left\{ \sum_{k=0}^{N-1} \left[ [\overline{H}(\zeta)v + \overline{V}(\zeta,\dot{\zeta})x_2 + \overline{G}(\zeta)]^T U [\overline{H}(\zeta)v + \overline{V}(\zeta,\dot{\zeta})x_2 + \overline{G}(\zeta)] + t + x_{2k}^T Q x_{2k} + \delta\omega(x_{1k}) \right] h_k \right\},$$

under the above mentioned constraints, which remain the same, except actuator torques, which become:

$$\tau_{min} \leq \overline{H}(\zeta)v + \overline{V}(\zeta,\dot{\zeta})x_2 + \overline{G}(\zeta) \leq \tau_{max} \tag{88}$$

Henceforth, inequality constraints $g_3$ and $g_4$ can be rewritten as:

$$g_3^D(x_k, v_k) = \tau_{min} - [\overline{H}(\zeta)v + \overline{V}(\zeta,\dot{\zeta})x_2 + \overline{G}(\zeta)] \leq 0 \tag{89}$$

$$g_3^D(x_k, v_k) = [\overline{H}(\zeta)v + \overline{V}(\zeta,\dot{\zeta})x_2 + \overline{G}(\zeta)] - \tau_{max} \leq 0 \tag{90}$$

Similar to the non-decoupled case, the decoupled problem might be written in the following form:

$$\underset{\substack{v \in V \\ h_k}}{\text{Min}} E_d^D$$

subject to:

$$x_{k+1} = f_{d_k}^D(x_k, \tau_k, h_k), k = 0, \ldots, N-1,$$

$$g_j^D(x_k, v_k, h_k) \leq 0, j \in \{1, 2, \ldots, J\}, \text{ and}$$

$$S_j^D(x_k) = 0, i \in \{1, 2, \ldots, I\}, k = 0, \ldots N. \tag{91}$$

The augmented Lagrangian associated to the decoupled formulation (P) is as follows:

$$L_\mu^D(x, v, h, \lambda, \rho, \sigma) = \tag{92}$$

$$\sum_{k=0}^{N-1} \left\{ [[\overline{H}(\zeta)v + \overline{V}(\zeta,\dot{\zeta})x_2 + \overline{G}(\zeta)]^T U [\overline{H}(\zeta)v + \overline{V}(\zeta,\dot{\zeta})x_2 + \overline{G}(\zeta)] + t + x_{2k}^T Q x_{2k} + \delta\omega(x_{1k}) ] h_k \right\} +$$

$$\sum_{k=0}^{N-1} \{\lambda_{k+1}^T(x_{k+1} - f_{d_k}(x_k, \tau_k, h_k))\} +$$

$$\sum_{k=0}^{N-1} h_k \left[ \sum_{l=1}^{L-1} \sum_{i=1}^{2} \psi_{\mu_s}(\sigma_k^i, s_i^{Dl}(x_k)) + \sum_{j=1}^{J} \phi_{\mu_g}(\rho_k^j, g_j^D(x_k, \tau_k, h_k)) \right] + \sum_{i=1}^{2} h_N \psi_{\mu_s}(\sigma_N^i, s_i^{D1}(x_k))$$

where the function $f_{d_k}(x_k, \tau_k, h_k)$ is defined by eq. (78) at time $k$, N is the total sampling number, and other parameters appearing in (86) are defined above.

The first order Karush-Kuhn-Tucker optimality necessary conditions require that for $x_k$, $v_k$, $h_k$, k=0, ..., N to be a solution to the problem (P), there must exist some positive Lagrange multipliers ($\lambda_k$, $\rho_k$), unrestricted sign multipliers $\sigma_k$, and finite positive penalty coefficients $\mu=(\mu_g,\mu_s)$ such that equations (74) are satisfied for the decoupled formulation. The co-states $\lambda_k$ are determined by backward integration of the adjunct state equation yielding:

$$\lambda_{k-1} = \qquad (93)$$
$$-2h_k \frac{\partial[\overline{H}(\zeta)v + \overline{V}(\zeta,\xi)x_2 + \overline{G}(\zeta)]}{\partial x_k} U[\overline{H}(\zeta)v + \overline{V}(\zeta,\xi)x_2 + \overline{G}(\zeta)] -$$
$$2Qx_{2k}h_k - \delta\nabla_{x_{1k}} \omega(x_{1k}) - F_d^T \lambda_k -$$
$$h_k\left[\sum_{l=1}^{L-1}\sum_{i=1}^{2} \nabla_{x_k} \psi_{\mu_s}(\sigma_k^i, s_i^{D1}(x_k))\right] -$$
$$h_k\left[\sum_{j=1}^{J} \nabla_{x_k} \phi_{\mu_g}(\rho_k^j, g_j^D(x_k, v_k, h_k))\right]$$

The gradient of the Lagrangian with respect to sampling period variables is:

$$\lambda_{k-1} = \qquad (94)$$
$$-2h_k \frac{\partial[\overline{H}(\zeta)v + \overline{V}(\zeta,\xi)x_2 + \overline{G}(\zeta)]}{\partial x_k} U[\overline{H}(\zeta)v + \overline{V}(\zeta,\xi)x_2 + \overline{G}(\zeta)] -$$
$$2Qx_{2k}h_k - \delta\nabla_{x_{1k}} \omega(x_{1k}) - F_d^T \lambda_k -$$
$$h_k\left[\sum_{l=1}^{L-1}\sum_{i=1}^{2} \nabla_{x_k} \psi_{\mu_s}(\sigma_k^i, s_i^{D1}(x_k))\right] -$$
$$h_k\left[\sum_{j=1}^{J} \nabla_{x_k} \phi_{\mu_g}(\rho_k^j, g_j^D(x_k, v_k, h_k))\right]$$

The gradient of the Lagrangian with respect to acceleration variables is:

$$\nabla_{v_k} L_\mu^D = 2\overline{H}(\zeta)U^T[\overline{H}(\zeta)v + \overline{V}(\zeta,\xi)x_2 + \overline{G}(\zeta)]h_k + \qquad (95)$$
$$z_k^T \lambda_k + h_k\left[\sum_{j=1}^{J} \nabla_{v_k} \phi_{\mu_g}(\rho_k^j, g_j^D(x_k, v_k, h_k))\right]$$

where $$Z_k = \begin{bmatrix} I_{5\times5} & h_k I_{5\times5} \\ 0_{5\times5} & I_{5\times5} \end{bmatrix} x_k - \begin{bmatrix} \frac{h_k^2}{2} I_{5\times5} \\ h_k I_{5\times5} \end{bmatrix} v_k,$$

$$k = 0, 2, \ldots, N-1.$$

In the previous equations, the quantities:

$$\frac{\partial[\overline{H}(\zeta)v + \overline{V}(\zeta,\xi)x_2 + \overline{G}(\zeta)]}{\partial x_k},$$

$$\nabla_{x_{1k}} \omega(x_{1k}), \nabla_{x_k} \phi_{\mu_g},$$

and $$\nabla_{v_k} \phi_{\mu_g}$$

are calculated using numerical differentiation formulas in equations 82-86.

With respect to implementation issues, an initial solution involving a fast converging kinematic-feasible solution is defined. It is based on an optimal time trajectory parameterization. The initial time diseretizations are assumed to be an equidistant grid for convenience, i.e., $$h_k = t_{k+1} - t_k = \frac{t_f - t_0}{N}, \qquad (96)$$
$$k = 1, 2, \ldots, N-1$$

Upon this parameterized minimum time trajectory, a model for predictive planning is built in order to achieve a good initial solution for the AL. At the calculation of the inertia matrix and Coriolis and centrifugal dynamics components, we can use the approach developed initially for serial robots by Walker and Orin based on the application of a Newton-Euler model of the robot dynamics. This method is generally straightforward, and is suitable for the case of MPM robots.

Regarding search direction update, a limited-memory quasi-Newton-like method is used at each iteration of the optimization process to solve for the minimization step at the primal level of AL, since the problem is of large-scale type. Refer to the flowchart 400 of FIGS. 4A-4B, which outlines the AL algorithm function and operation.

Figure 4A:
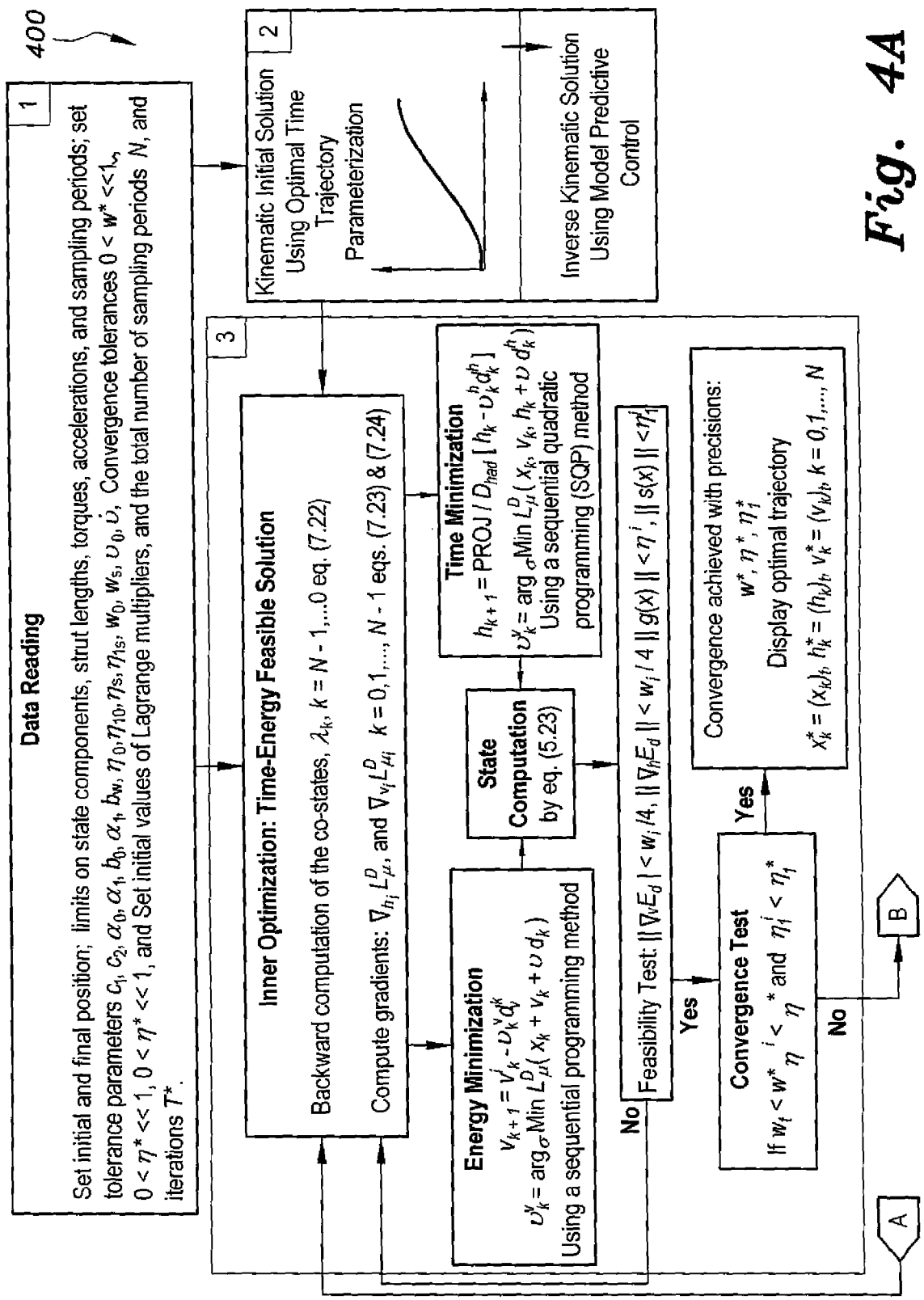
FIGS. 4A, 4B is a flowchart showing the AL algorithm function and operation used in a control method for mobile parallel manipulators according to the present invention.
Figure 4B:
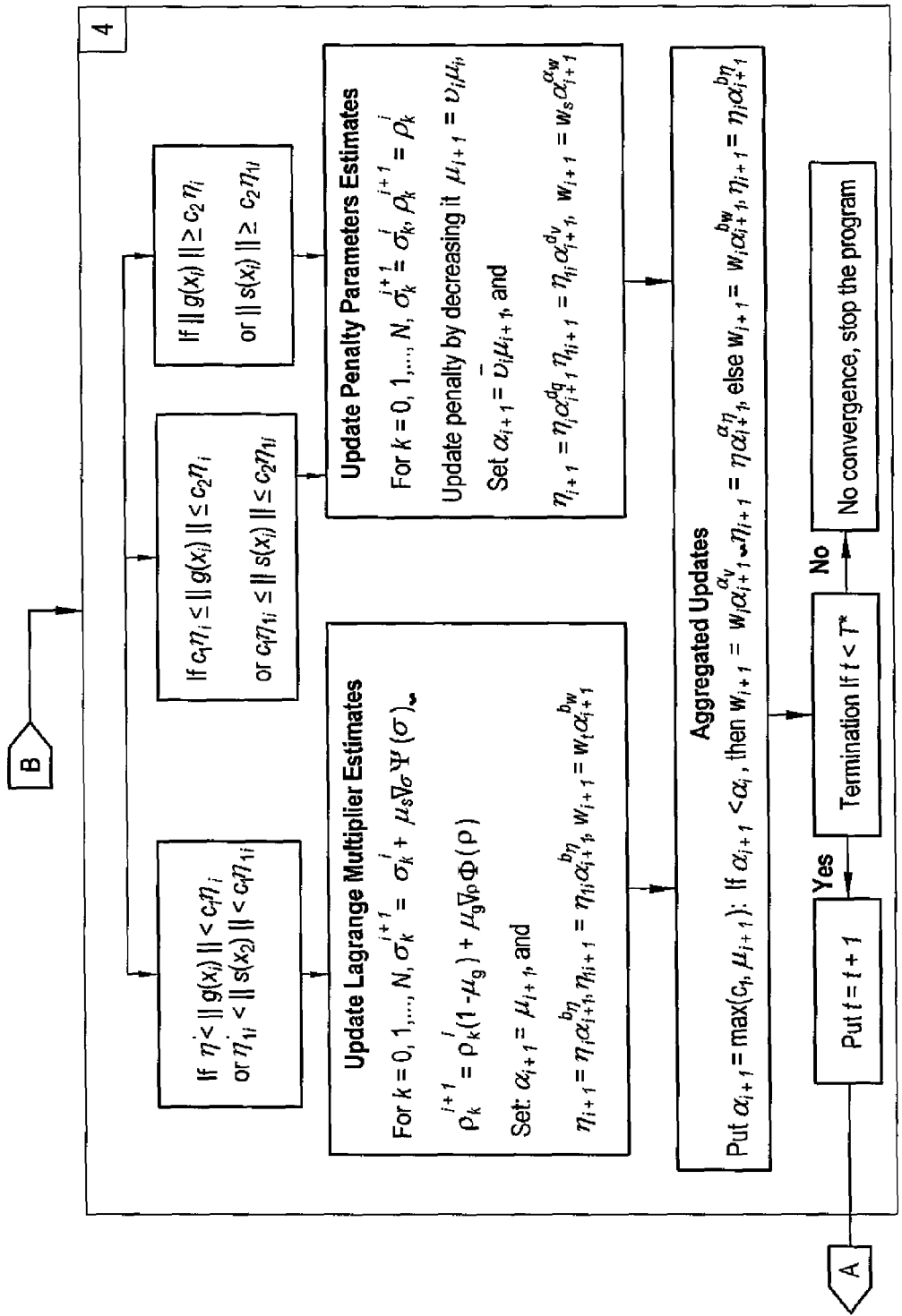

In the present method, a systematic procedure is used for solving the augmented Lagrangian implementation, as shown in FIGS. 4A-4B. In this procedure, the first step is selecting robot parameters, task definition, (such as starting, intermediate and final poses), workspace limitations and simulation parameters. Then the kinematic unit defines a feasible solution satisfying initial and final poses. After that, the inner optimization loop solves for ALD minimization with respect to sampling periods and acceleration control variables to give the MPM dynamic state.

In the following step, this state is tested within against feasibility tolerances. The feasibility is done by testing the norms of all equality and inequality constraints against given tolerances. If the feasibility test fails, restart the inner optimization unit. Otherwise, if the feasibility test succeeds, i.e., the current values of the penalty are good in maintaining near-feasibility of iterations, a convergence test is made against optimal tolerances. If convergence holds, display optimal results and end the program. If there is non-convergence, go further to the dual part of ALD to test for constraints satisfaction, and update multipliers, penalty and tolerance parameters.

If the constraints are satisfied with respect to a first tolerance level (judged as good, although not optimal), then the multipliers are updated without decreasing penalty. If the constraints are violated with respect to a second tolerance level, then keep the multipliers unchanged and decrease the penalty to ensure that the next sub-problem will place more emphasis on reducing the constraints violations. In both cases, the tolerances are decreased to force the subsequent primal iterates to be increasingly accurate solutions of the primal problem.

Offline trajectory planning simulation involves using Matlab. The initial values of thetas were chosen as follows: $\theta_L=0$; $\theta_r=0$; $\theta_1=1.3$; $\theta_2=0.8$; $\theta_3=1.4$. The target values of thetas were: $\theta_L=1$; $\theta_r=0.8$; $\theta_1=1.1$; $\theta_2=1.2$; $\theta_3=1.1$.

A first case involved minimizing time, and a second case involved minimizing energy. Torque variations and position variations were recorded. Small but acceptable errors were observed.

Regarding the online trajectory planning, the result of the offline trajectory planning is used to run 50 different trajectories, each one contains 21 points along the trajectory. This gives 1050 samples, among which 950 are considered for training, whereas testing and validation datasets were each obtained using 100 entry samples.

Figure 5:
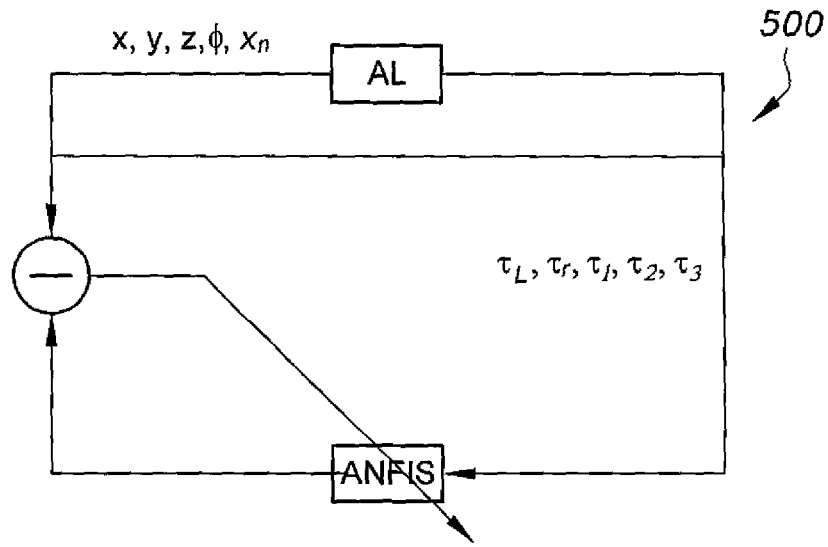
FIG. 5 is a block diagram showing the AL solution for learning of an ANFIS module in a control method for mobile parallel manipulators according to the present invention.

The Adaptive Neural Fuzzy Inference System (ANFIS) module training system 500 is shown in FIG. 5. Training the ANFIS is an optimization task with the goal of finding a set of weights that minimizes an error measure. Observed error during the training was RMSE less than 0.1 in less than 10 epochs. It is noted that the configuration used for the learning is determined among infinitely many solutions that exist for each input.

It is to be understood that the present invention is not limited to the embodiments described above, but encompasses any and all embodiments within the scope of the following claims.

We claim:

1. A computer-implemented control method for a mobile parallel manipulator (MPM), comprising the steps of:
    (a) setting trajectory parameters in an offline dataset, the trajectory parameters including initial and final positions, limits on state components, strut lengths, torques, accelerations, and sampling periods;
    (b) formulating, off-line, a mathematical description of a constrained optimization problem for trajectory planning of the mobile parallel manipulator (MPM), the mathematical description including:
        an energy and time cost minimization function and augmented Lagrange multipliers utilized in an augmented Lagrange decoupling procedure (ALD) to transform the problem into a non-constrained problem, the energy and time cost minimization function including inputs describing:
            (i) a moving coordinate system related to self-movement of a base of the MPM relative to a fixed reference frame; and
            (ii) torques and angular positions of actuators coupled to an end plate of the MPM;
        an inertia matrix invertibility condition control law specification;
        a discrete dynamic model approximation using a multi-step Adams-Bashforth predictive-corrective formulation;
        a stopping criteria, wherein an iterative solution to the optimization problem describes at least one optimized trajectory;
    (c) saving the at least one optimized trajectory;
    (d) deriving at least one inverse kinematic solution based on the at least one optimized trajectory, wherein a joint position characterized by coordinates ($q_1$, $q_2$, $q_3$, $q_4$, $q_5$) is found from Cartesian coordinates (x, y, z, $\phi$);
    (e) formulating, on-line, an optimized forward kinematic solution based on the at least one inverse kinematic solution;
    (f) transferring to the MPM a resultant trajectory plan based on the optimized forward kinematic solution; and
    (g) controlling the MPM actuators to constrain the MPM to execute motion consistent with the at least one optimized trajectory so that time, energy, and, alternatively, time and energy of the MPM motion is optimally minimized.

2. The computer-implemented control method according to claim 1, wherein said at least one inverse kinematic solution deriving step further comprises the step of training a Neuro-Fuzzy Inverse Kinematics (NeFIK) network utilizing back propagation to produce an error-minimized joint position in a preferred configuration, the NeFIK network being a multi-layer feed forward adaptive network having:
    a first, two-input layer characterizing crisp values of the Cartesian position;
    a last, three-output layer characterizing corresponding crisp joint values;
    a first hidden fuzzification layer transferring the crisp inputs to linguistic variables via sigmoidal transfer functions;
    a second hidden rule layer applying a Product t-norm to produce firing strengths of each rule; and
    a third hidden normalization layer.

3. The computer-implemented control method according to claim 1, further comprising the step of training an Adaptive Neural Fuzzy Inference System (ANFIS) with said at least one inverse kinematic solution to further optimize said optimized forward kinematic solution.

4. The computer-implemented control method according to claim 3, wherein said further optimizing step comprises solely minimizing energy requirements of said forward kinematic solution.

5. The computer-implemented control method according to claim 3, wherein said further optimizing step comprises solely minimizing time requirements of said forward kinematic solution.

6. The computer-implemented control method according to claim 3, wherein said further optimizing step comprises minimizing time and energy requirements of said forward kinematic solution.

7. The computer-implemented control method according to claim 3, wherein said discrete dynamic model approximation using a multi-step Adams-Bashforth predictive-corrective formulation is characterized by the relations:

$$x_{1_{k+1}} = x_{1_k} + 1.5 h_k x_{2_k} + 0.5 h_k x_{2_{k-1}} + \frac{5 h_k^3}{12} v_{2_k}$$

$$x_{2_{k+1}} = x_{2_k} + 1.5 h_k v_{2_k} + 0.5 h_k v_{2_{k-1}} + \frac{5 h_k^3}{12} \dot{v}_{2_k}$$

wherein x is a robot trajectory position state, v is a robot trajectory velocity state, and h is a representative sampling period.

8. The computer-implemented control method according to claim 7, further comprising the step of characterizing said inertia matrix invertibility condition control law specification comprises the relation:

$u = \overline{H}(\zeta) v + \overline{V}(\zeta, \dot{\zeta}) x_2 + \overline{G}(\zeta).$ 9. The computer-implemented control method according to claim 8, further comprising the step of utilizing a Levenberg-Marquard version of the gradient back propagation algorithm as a training rule option in said NeFIK network while computing said energy and time cost minimization function.

10. The computer-implemented control method for a mobile parallel manipulator according to claim 9, further comprising the step of avoiding singularity and joint limits during said ALD calculation by computing an augmented function characterized by the relation:

$\dot{q}_s = \dot{q}_{s1} + \dot{q}_{s2},$ where $\dot{q}$ represents vector joint rates of said MPM.

11. A computer software product, comprising a non-transitory medium readable by a processor, the non-transitory medium having stored thereon a set of instructions for performing a control method for a mobile parallel manipulator, the set of instructions including:
(a) a first sequence of instructions which, when executed by the processor, causes said processor to set trajectory parameters in an offline dataset, said trajectory parameters including initial and final positions, limits on state components, strut lengths, torques, accelerations, and sampling periods;
(b) a second sequence of instructions which, when executed by the processor, causes said processor to formulate, off-line, a mathematical description of a constrained optimization problem for trajectory planning of said mobile parallel manipulator (MPM), the mathematical description including:
an energy and time cost minimization function and augmented Lagrange multipliers utilized in an augmented Lagrange decoupling procedure (ALD) to transform the problem into a non-constrained problem, said energy and time cost minimization function including inputs describing (i) a moving coordinate system related to self-movement of a base of said MPM relative to a fixed reference frame and (ii) torques and angular positions of actuators coupled to an end plate of said MPM;
an inertia matrix invertibility condition control law specification;
a discrete dynamic model approximation using a multi-step Adams-Bashforth predictive-corrective formulation;
a stopping criteria, wherein an iterative solution to the optimization problem describes at least one optimized trajectory;
(c) a third sequence of instructions which, when executed by the processor, causes said processor to save the at least one optimized trajectory;
(d) a fourth sequence of instructions which, when executed by the processor, causes said processor to derive at least one inverse kinematic solution based on said at least one optimized trajectory wherein a joint position characterized by coordinates ($q_1$, $q_2$, $q_3$, $q_4$, $q_5$) is found from Cartesian coordinates (x, y, z, $\phi$);
(e) a fifth sequence of instructions which, when executed by the processor, causes said processor to formulate, on-line, an optimized forward kinematic solution based on said at least one inverse kinematic solution;
(f) a sixth sequence of instructions which, when executed by the processor, causes said processor to transfer to the MPM a resultant trajectory plan based on said optimized forward kinematic solution; and
(g) a seventh sequence of instructions which, when executed by the processor, causes said processor to control said MPM actuators, wherein said MPM executes motion consistent with the at least one optimized trajectory so that time, energy, and alternatively time and energy of the MPM motion is optimally minimized.

12. The computer software product according to claim 11, further comprising an eighth sequence of instructions which, when executed by the processor, causes said processor to train a Neuro-Fuzzy Inverse Kinematics (NeFIK) network utilizing back propagation to produce an error minimized said joint position in a preferred configuration, wherein said NeFIK is a multi-layer feed forward adaptive network having a first, two input layer characterizing crisp values of said Cartesian position, a last, three output layer characterizing corresponding crisp joint values, a first hidden fuzzification layer transferring said crisp inputs to linguistic variables via sigmoidal transfer functions, a second hidden rule layer applying a Product t-norm to produce firing strengths of each said rule, and a third hidden normalization layer.

13. The computer software product according to claim 11, further comprising a ninth sequence of instructions which, when executed by the processor, causes said processor to train an Adaptive Neural Fuzzy Inference System (ANFIS) with said at least one inverse kinematic solution to further optimize said optimized forward kinematic solution.

14. The computer software product according to claim 13, further comprising a tenth sequence of instructions which, when executed by the processor, causes said processor to solely minimize energy requirements of said forward kinematic solution.

15. The computer software product according to claim 13, further comprising an eleventh sequence of instructions which, when executed by the processor, causes said processor to solely minimize time requirements of said forward kinematic solution.

16. The computer software product according to claim 13, further comprising a twelfth sequence of instructions which, when executed by the processor, causes said processor to minimize time and energy requirements of said forward kinematic solution.

17. The computer software product according to claim 13, further comprising a thirteenth sequence of instructions which, when executed by the processor, causes said processor to, during said discrete dynamic model approximation, use a multi-step Adams-Bashforth predictive-corrective formulation is characterized by the relations:

$$x_{1_{k+1}} = x_{1_k} + 1.5 h_k x_{2_k} + 0.5 h_k x_{2_{k-1}} + \frac{5 h_k^3}{12} v_{2_k}$$

$$x_{2_{k+1}} = x_{2_k} + 1.5 h_k v_{2_k} + 0.5 h_k v_{2_{k-1}} + \frac{5 h_k^3}{12} \dot{v}_{2_k}$$

wherein x is a robot trajectory position state, v is a robot trajectory velocity state, and h is a representative sampling period.

18. The computer software product according to claim 17, further comprising a fourteenth sequence of instructions which, when executed by the processor, causes said processor to characterize said inertia matrix invertibility condition control law according to the relation:

$$u = \overline{H}(\zeta) v + \overline{V}(\zeta, \dot{\zeta}) x_2 + \overline{G}(\zeta).$$

19. The computer software product according to claim 18, further comprising a fifteenth sequence of instructions which, when executed by the processor, causes said processor to utilize a Levenberg-Marquard version of the gradient back propagation algorithm as a training rule option in said NeFIK network while computing said energy and time cost minimization function.

20. The computer software product according to claim 19, further comprising a sixteenth sequence of instructions which, when executed by the processor, causes said processor to avoid singularity and joint limits during said ALD calculation by computing an augmented function characterized by the relation:

$$\dot{q}_s = \dot{q}_{s1} + \dot{q}_{s2},$$

where $\dot{q}$ represents vector joint rates of said MPM.

* * * * *